(12) United States Patent
Okuno et al.

(10) Patent No.: US 6,687,433 B2
(45) Date of Patent: Feb. 3, 2004

(54) WDM OPTICAL COMMUNICATION SYSTEM

(75) Inventors: Toshiaki Okuno, Yokohama (JP); Motoki Kakui, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 599 days.

(21) Appl. No.: 09/726,603

(22) Filed: Dec. 1, 2000

(65) Prior Publication Data

US 2001/0000442 A1 Apr. 26, 2001

Related U.S. Application Data

(63) Continuation-in-part of application No. PCT/JP00/01659, filed on Mar. 17, 2000.

(30) Foreign Application Priority Data

Apr. 1, 1999  (JP) .......................................... P11-095164

(51) Int. Cl.⁷ ................................................. G02B 6/26
(52) U.S. Cl. .......................... 385/27; 385/39; 359/154; 359/173
(58) Field of Search ........................... 385/27, 39, 50, 385/95, 122; 359/152–154, 173

(56) References Cited

U.S. PATENT DOCUMENTS

| | | | |
|---|---|---|---|
| 5,191,631 A | 3/1993 | Rosenberg | |
| 5,539,563 A | 7/1996 | Park | |
| 6,266,467 B1 * | 7/2001 | Kato et al. .................. | 385/123 |
| 6,462,849 B1 * | 10/2002 | Kath et al. .................. | 359/161 |

(List continued on next page.)

FOREIGN PATENT DOCUMENTS

| | | |
|---|---|---|
| JP | 5-344075 | 12/1993 |
| JP | 7-336297 | 12/1995 |
| JP | 8-50208 | 2/1996 |
| JP | 9-23187 | 1/1997 |
| JP | 9-116489 | 5/1997 |
| JP | 10-73738 | 3/1998 |
| JP | 10-308706 | 11/1998 |

OTHER PUBLICATIONS

"L–Band 64×10 Gb/s DWDM Transmission over 500 km DSF with 50GHz Channel Spacing", A.K. Srivastava et al., ECOC'98, Sep. 1998, pp. 73–75.

"640 Gb/s WDM Transmission Over 400 km of Dispersion–Shifted Fiber using 1.58 μm Band and Initial Chirp Optimization", Y. Yano et al., ECOC'98, Sep. 1998, pp. 261–262.

Properties of Gain–shifted EDFA (1580 nm–band EDFA) Cascades in WDM Transmission Systems, T. Sakamoto et al., pp. 88–91.

(List continued on next page.)

*Primary Examiner*—Rodney Bovernick
*Assistant Examiner*—Juliana K. Kang
(74) *Attorney, Agent, or Firm*—McDermott, Will & Emery

(57) ABSTRACT

The present invention relates to a WDM optical communication system comprising a structure which effectively suppresses the waveform deterioration resulting from nonlinear optical phenomena of each signal in a 1.58-μm wavelength band in an optical transmission line including a dispersion-shifted optical fiber having a zero-dispersion wavelength in a 1.55-μm wavelength band. The WDM optical communication system includes a hybrid transmission unit in which a single-mode optical fiber and a dispersion-shifted optical fiber are arranged such that signals successively pass therethrough. The single-mode optical fiber has a zero-dispersion wavelength in a 1.3-μm wavelength band and an effective area $A_{SMF}$ at a wavelength of 1.58 μm. The dispersion-shifted optical fiber has a zero-dispersion wavelength in the 1.55-μm wavelength band and, at a wavelength of 1.58 μm, a dispersion with an absolute value of 0.5 ps/nm/km or more and an effective area $A_{DSF}$ smaller than the effective area $A_{SMF}$ of the single-mode optical fiber.

21 Claims, 18 Drawing Sheets

U.S. PATENT DOCUMENTS

| | | | | |
|---|---|---|---|---|
| 6,466,721 | B1 | * | 10/2002 | Tsukitani et al. ........... 385/127 |
| 6,476,949 | B1 | * | 11/2002 | Loh et al. ................... 359/161 |
| 6,496,615 | B2 | * | 12/2002 | Okuno ....................... 385/123 |
| 6,577,800 | B2 | * | 6/2003 | Sarchi et al. ............... 385/123 |
| 2002/0102082 | A1 | * | 8/2002 | Sarchi et al. ............... 385/123 |
| 2003/0044112 | A1 | * | 3/2003 | Tsukitani et al. ............. 385/27 |

OTHER PUBLICATIONS

"1580–nm Band, Equally Spaced 8×10 Gb/s WDM Channel Transmission over 360 km (3×120km) of Dispersion–Shifted Fiber Avoiding FWM Impairment", M. Jinno et al., IEEE Photonics Technology Letters, vol. 10, No. 3, Mar. 1998, pp. 454–456.

"Degradations Due to Stimulated Brillouin Scattering in Multigigabit Intensity–Modulated Fiber–Optic Systems", D.A. Fishman et al., Journal of Lightwave Technology, vol. 11, No. 11, Nov. 1993, pp. 1721–1728.

"Analysis of cross–phase modulation (XPM) effect on WDM transmission performance", N. Kikuchi et al., Electronics Letters, vol. 33, No. 8, Apr. 10, 1997, pp. 653–654.

"Cross–Phase Modulation in Dispersive Fibers: Theoretical and Experimental Investigation of the Impact of Modulation Frequency", T. Chiang et al., IEEE Photonics Technology Letters, vol. 6, No. 6, Jun. 1994, pp. 733–736.

"Impact of cross–phase modulation on WDM transmission over dispersion–shifted fiber", N. Kikuchi et al., OFC'96 Technical Digest, pp. 40–42.

"A 1580–nm Band WDM Transmission Technology Employing Optical Duobinary Coding", S. Aisawa et al., Journal of Lightwave Technology, vol. 17, No. 2, Feb. 1999, pp. 191–199.

"Hikari Soliton Houshiki ni yoru Maibyou 1 Tera Bit (1Tbps) no Chuo Kyori Densou wo Jitsugen", Zaidan Houjin Telecom Sentan Gijutsu Shien Center, SCAT NEWS, No. 57, (Nov. 1999), pp. 1–3.

* cited by examiner

WDM OPTICAL COMMUNICATION SYSTEM

RELATED APPLICATIONS

This is a Continuation-In-Part application of International Patent application serial No. PCT/JP00/01659 filed on Mar. 17, 2000, now pending, which in turn claims the benefit of Japanese Patent Application No. P1999-095164, filed Apr. 1, 1999, the disclosures of which Applications are incorporated by reference herein.

The benefit of the filing and priority dates of the International and Japanese Applications is respectfully requested.

BACKGROUND OF THE INVENTION

1. Field of the Invention

The present invention relates to a WDM (Wavelength Division Multiplexing) optical communication system suitable for WDM optical communications utilizing a plurality of signals included in a 1.58-$\mu$m wavelength band (1570 nm to 1620 nm).

2. Related Background Art

WDM optical communications are a communication technique enabling large-capacity optical communications by utilizing a plurality of signals having wavelengths different from each other. For the WDM optical communications, light in a 1.55-$\mu$m wavelength band (1530 nm to 1560 nm) is utilized since the transmission loss of silica-based optical fibers which have been widely utilized as transmission lines is small in the 1.55-$\mu$m wavelength band, and since the gain of Er-doped optical fiber amplifier (EDFA: Er-Doped Fiber Amplifier) for amplifying signals is high in the 1.55-$\mu$m wavelength band.

Examples of transmission lines applicable to WDM optical communications in the 1.55-$\mu$m wavelength band include a single-mode optical fiber having a zero-dispersion wavelength in a 1.3-$\mu$m wavelength band (1260 nm to 1350 nm), a dispersion-shifted optical fiber having a zero-dispersion wavelength in the 1.55-$\mu$m wavelength band, and a hybrid transmission line in which they are mixed. Since the single-mode optical fiber has a large positive dispersion in the 1.55-$\mu$m wavelength band, the single-mode optical fiber and a dispersion-compensating optical fiber (dispersion compensator) having a large negative dispersion in the 1.55-$\mu$m wavelength band are often combined together, so as to compensate for dispersion in the 1.55-$\mu$m wavelength band.

On the other hand, it has been known that the dispersion-shifted optical fiber, in general, is likely to deteriorate the waveform of each signal due to nonlinear optical phenomena, such as four-wave mixing in particular, in optical communications in the 1.55-$\mu$m wavelength band since it has a very small absolute value of dispersion (nearly zero) in the 1.55-$\mu$m wavelength band and a small effective area. Since such a waveform deterioration caused by nonlinear phenomena cannot be restored, the occurrence of nonlinear optical phenomena must be suppressed to a minimum. For suppressing the occurrence of nonlinear optical phenomena, the power of each signal may be lowered. In the case of long-distance optical communications, however, if the signal power is lowered, then the intervals between repeaters must be shortened, whereby the cost rises along with the increase in optical amplifiers and the like which are disposed. Hence, as another effective method of suppressing nonlinear optical phenomena, optical communications may be carried out in a wavelength band, other than the 1.55-$\mu$m wavelength band, in which the absolute value of dispersion is sufficiently high to maintain effects of non-linear dispersion within tolerable limit.

On the other hand, larger capacities are demanded in optical communications. From this viewpoint, the research and development aimed at enlarging the amplification bandwidth by use of optical fiber amplifiers has been under way. Also, the research and development of optical fiber amplifiers capable of amplification in wavelength bands other than the 1.55-$\mu$m wavelength band has been under way, and an optical fiber amplifier which can amplify signals in the 1.58-$\mu$m wavelength band, for example, has been realized.

From the foregoing technical background, WDM optical communications utilizing a plurality of signals included in the 1.58-$\mu$m wavelength band in place of or in addition to the 1.55-$\mu$m wavelength band have been taken into consideration. The transmission loss of silica-based optical fibers is relatively small even in the 1.58-$\mu$m wavelength band, so that there are no inconveniences in terms of transmission loss.

As configurations of WDM optical communication system which transmit signals in the 1.58-$\mu$m wavelength band, those described in a literature—A. K. Srivastava et al., ECOC'98, postdeadline paper, pp. 73–75 (1998)—, a literature—Y. Yano, et al., ECOC'98, pp. 261–262 (1998)—, a literature —T. Sakamoto, et al., OAA'98, TuB3, pp. 88–91 (1998)—, and a literature—M. Jinno, et al., IEEE Photon. Technol. Lett., Vol. 10, No. 3, pp. 454–456 (1998)—, for example, have been known. Each of the transmission lines of WDM optical communication systems described in these literatures is constituted by a dispersion-shifted optical fiber alone.

SUMMARY OF THE INVENTION

The inventors have studied conventional WDM optical communication systems and, as a result, have found a problem as follows. In the dispersion-shifted optical fiber having a zero-dispersion wavelength in the 1.55-$\mu$m wavelength band, the absolute value of dispersion in the 1.58-$\mu$m wavelength band is about 2 to 3 ps/nm/km, whereby four-wave mixing is relatively hard to occur. Employing such a dispersion-shifted optical fiber in a transmission line can increase the power of each signal, thereby making it possible to elongate repeater intervals. If each of the signals have a higher power while the number of signals (number of channels) subjected to wavelength multiplexing increases, however, then cross-phase modulation (XPM), which is another nonlinear optical phenomenon, becomes remarkable. In addition, for-wave mixing has also been in a serious problem, if a channel spacing of signals becomes lower or signal input power becomes much higher.

In order to overcome problems such as the one mentioned above, it is an object of the present invention to provide a WDM optical communication system which: effectively suppresses the waveform deterioration resulting from non-linear optical phenomena, such as four-wave mixing and cross-phase modulation in particular, of each signal in the 1.58-$\mu$m wavelength band in a transmission line including a dispersion-shifted optical fiber having a zero-dispersion wavelength in the 1.55-$\mu$m wavelength band.

The WDM optical communication system according to the present invention is a WDM (Wavelength Division Multiplexing) optical communication system for transmitting a plurality of signals included in the 1.58-$\mu$m wavelength band (1570 nm to 1620 nm). This WDM optical communication system comprises at least one hybrid transmission unit for transmitting the plurality of signals. This hybrid transmission unit comprises at least a single-mode optical fiber and a dispersion-shifted optical fiber, whereas these optical fibers are arranged such that signals emitted from an optical transmitter successively pass though the single-mode optical fiber and the dispersion-shifted optical fiber. For enabling bidirectional communications of signal, the hybrid transmission unit may comprise a dispersion-shifted optical fiber and two single-mode optical fibers disposed so as to sandwich the dispersion-shifted optical fiber therebetween. Namely, the hybrid transmission unit in the WDM optical communication system according to the present invention is configured such that signals pass through a single-mode optical fiber before entering the dispersion-shifted optical fiber, regardless of the traveling direction of signal.

The single-mode optical fiber has a zero-dispersion wavelength in the 1.3-$\mu$m wavelength band. (1260 nm to 1350 nm) and an effective area $A_{SMF}$ at a wavelength of 1.58 $\mu$m. The dispersion-shifted optical fiber has a zero-dispersion wavelength in the 1.55-$\mu$m wavelength band (1530 nm to 1565 nm). If the zero-dispersion wavelength of the dispersion-shifted optical fiber is set to the 1.55-$\mu$m wavelength band, then the accumulated part of dispersion in this wavelength band can be made substantially zero. Preferably, the dispersion-shifted optical fiber has a dispersion with an absolute value of 0.5 ps/nm/km or more at a wavelength of 1.58 $\mu$m. It is because of the fact that dispersion is intentionally generated to a certain extent in the signal wavelength band, so as to reduce the influence of four-wave mixing, thereby enabling high-density wavelength multiplexing. Preferably, the upper limit of dispersion at a wavelength of 1.58 $\mu$m is 5 ps/nm/km. This is for keeping waveform from deteriorating due to the increase in cumulative dispersion. Preferably, at a wavelength of 1.58 $\mu$m, the single-mode optical fiber has an effective area $A_{SMF}$ greater than the effective area $A_{DSF}$ of the dispersion-shifted optical fiber. As the single-mode optical fiber, not only a common type doped with $GeO_2$, but also pure silica core type optical fibers can be employed.

In this WDM optical communication system, as in the foregoing, a plurality of signals included in the 1.55-$\mu$m wavelength band would propagate through a dispersion-shifted optical fiber after propagating through the single-mode optical fiber whether the hybrid transmission unit has a configuration for unidirectional or bidirectional optical communications. Therefore, the peak power of each signal at the output end of the single-mode optical fiber is kept low because of its attention. Namely, the single-mode optical fiber disposed upstream from the dispersion-shifted optical fiber in the traveling direction of signal functions as an attenuator for lowering the incident light power to the dispersion-shifted optical fiber beforehand. Also, since the single-mode optical fiber has a relatively large effective area $A_{SMF}$ and a high dispersion $D_{SMF}$, not only four-wave mixing but also cross-phase modulation is restrained from occurring. As a consequence, the influence of interactions between wavelengths is lowered, whereby the widening of spectrum and deterioration of waveform in each signal at the output end of the single-mode optical fiber are sufficiently suppressed. Also, since each signal fed into the dispersion-shifted optical fiber has already propagated through the single-mode optical fiber, it has a lower peak power. Therefore, nonlinear optical phenomena are harder to occur in the dispersion-shifted optical fiber as well, whereby the waveform deterioration of each signal at the output end of the dispersion-shifted optical fiber can be kept low.

On the other hand, the single-mode optical fiber preferably has a fiber length longer than its effective length $L_{eff}$ (unit being km) by 5 km or more (e.g., by 10 km or more). Namely, since the waveform deterioration due to nonlinear optical phenomena is not considered to occur substantially in the surplus part of single-mode optical fiber, the power of each signal entering the dispersion-shifted optical fiber can effectively be lowered while elongating its transmission distance. In the case where the fiber length of single-mode optical fiber is longer than the effective length $L_{eff}$ as such, it is preferred that an optical amplifier be disposed on the exit end side of the dispersion-shifted optical fiber so as to compensate for the loss in signals emitted from the dispersion-shifted optical fiber (in order to keep the incident light power to the dispersion-shifted optical fiber from increasing). In the case where the hybrid transmission unit has a configuration capable of bidirectional optical communications in which the dispersion-shifted optical fiber is sandwiched between two single-mode optical fibers, it is also preferred that an optical amplifier be installed on the exit end side of the dispersion-shifted optical fiber in the traveling direction of signal in view of the fiber length of single-mode optical fibers.

Letting D be the dispersion at a wavelength of 1.58 $\mu$m, P be the optical power per channel in a plurality of signals launches from the single-mode optical fiber to the dispersion-shifted optical fiber, and CS be the individual channel spacing in the plurality of signals, the dispersion-shifted optical fiber satisfies the condition of $$\frac{P}{D \cdot CS} \leq 4.2 \times 10^{13} [(W \cdot m)/s].$$

If the dispersion-shifted optical fiber satisfies such a condition with respect to the single-mode optical fiber, then the transmission line length can be elongated without enlarging the wavelength band in which dispersion becomes greater. More preferably, the dispersion-shifted optical fiber satisfies the condition of $$\frac{P}{D \cdot CS} \leq 2.6 \times 10^{13} [(W \cdot m)/s].$$

If this condition is satisfied, then the usable signal wavelength band enlarges, and the transmission line length can be elongated without dispersion compensation even in the case where the number (number of channels) of signals increases.

The WDM communication system according to the present invention may further comprise an optical amplifier, disposed at least on the entrance end side of the single-mode optical fiber on which signals are incident, for amplifying the signals. In this configuration, the single-mode optical fiber preferably has a fiber length of 10 km or more. It is because of the fact that, if the single-mode optical fiber has a length of 10 km or more, then the peak power of each signal entering the dispersion-shifted optical fiber can be kept low even when the power of each signal reaching the single-mode optical fiber .from the optical amplifier is increased, which is effective in suppressing the occurrence of nonlinear optical phenomena in the dispersion-shifted optical fiber. Thus, not only the waveform deterioration of each signal passed through the hybrid transmission unit constituting a part of the WDM optical communication system is suppressed, but also the output power of optical amplifier can be increased, by which the cost of the whole system can be cut down.

The hybrid transmission unit in the WDM optical communication system according to the present invention may further comprise a dispersion-compensating optical fiber (dispersion compensator) having a dispersion with an opposite sign against the dispersion of the single-mode optical fiber in the 1.58-μm wavelength band. In this case, the dispersion of the single-mode optical fiber is compensated for by the dispersion-compensating optical fiber, whereby the pulse waveform of each signal is restored.

There are various modes concerning the arrangement of the dispersion-compensating optical fiber. For example, while the dispersion-shifted optical fiber is divided into two or more components, the dispersion-compensating optical fiber can be arranged between a set of components selected therefrom. Also, an optical amplifier for amplifying the signals to enter the single-mode optical fiber may be disposed on the entrance end side of the single-mode optical fiber, whereas the dispersion-compensating optical fiber may be arranged so as to sandwich the optical amplifier with the single-mode optical fiber. The dispersion-compensating optical fiber is characterized in that it has a very high nonlinear characteristic and a very large dispersion, whereby the upper limit of power in signals which can propagate therethrough is low. Since the dispersion-compensating optical fiber is disposed upstream from the optical amplifier in the traveling direction of signal, the signals before being amplified inevitably propagate through the dispersion-shifted optical fiber in the WDM optical communication system according to the present invention. Due to this configuration, nonlinear optical phenomena are restrained from occurring in the dispersion-compensating optical fiber, whereby the waveform of each signal can be kept from deteriorating.

Preferably, whether the hybrid transmission unit has a configuration for unidirectional or bidirectional optical communications in the WDM optical communication system according to the present invention, the single-mode optical fiber has a polarization mode dispersion of $2 \text{ ps·km}^{-\frac{1}{2}}$ or less at a wavelength of 1.58 μm, and the dispersion-shifted optical fiber has a polarization mode dispersion of $2 \text{ ps·km}^{-\frac{1}{2}}$ or less at a wavelength of 1.58 μm. In the case of the configuration in which the hybrid transmission unit is provided with a dispersion-compensating optical fiber, the dispersion-compensating optical fiber preferably has a polarization mode dispersion of $2 \text{ ps·km}^{-\frac{1}{2}}$ or less at a wavelength of 1.58 μm. Preferably, letting B be the bit rate of signals, the hybrid transmission unit as a whole has a cumulative polarization dispersion of: $1/(4B)$ or less at a wavelength of 1.58 μm in the WDM optical communication system according to the present invention. In each of these cases, the occurrence of cross-phase modulation depending on the polarization state of signals and the occurrence of waveform deterioration resulting from dispersion can be suppressed more effectively.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 17A is a view for explaining the effective length $L_{eff}$ of single-mode optical fiber, whereas

DETAILED DESCRIPTION OF THE PREFERRED EMBODIMENTS

In the following, embodiments of the WDM optical communication system according to the present invention will be explained with reference to FIGS. 1, 2, 3A to 8B, 9, 10A to 10C, 11 to 16, 17A, 17B, 18, and 19A to 20C. In the explanation of the drawings, constituents identical to each other will be referred to with numerals or letters identical to each other, without repeating their overlapping descriptions.

First Embodiment

Figure 1:
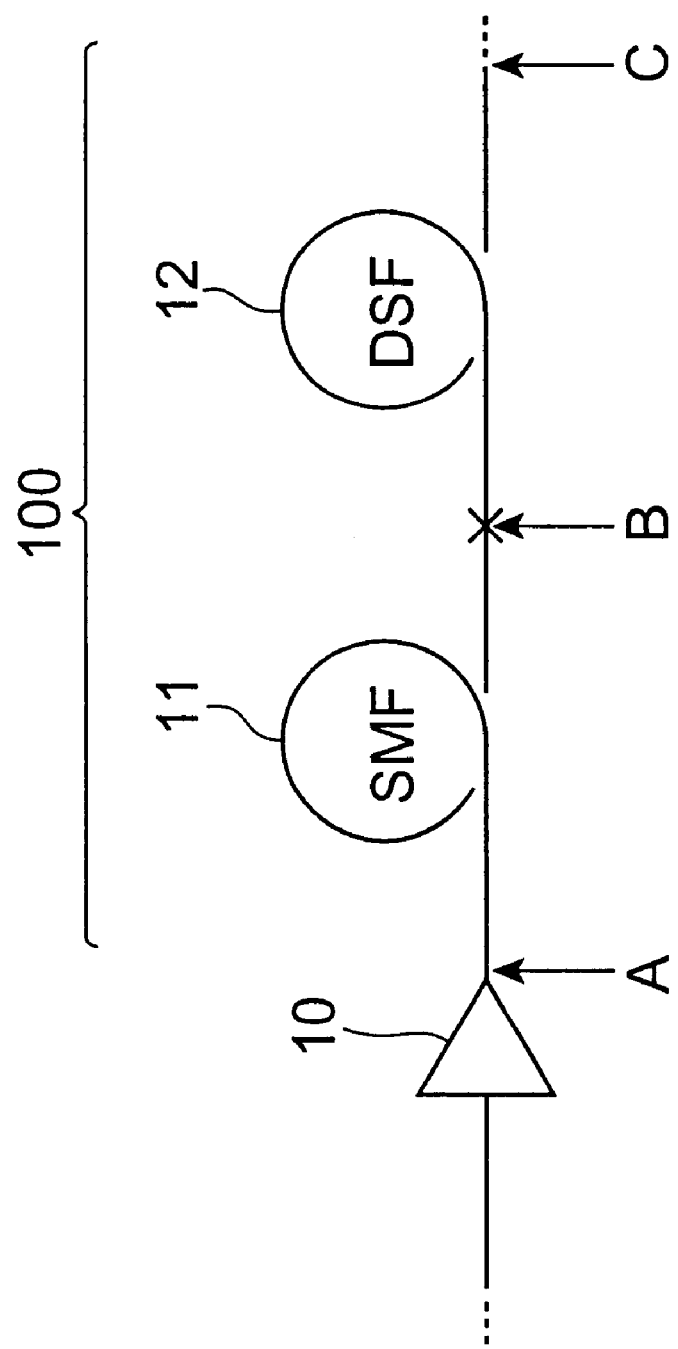
FIG. 1 is a view showing a basic configuration (mainly the part of hybrid transmission unit) of a first embodiment of the WDM optical communication system according to the present invention.

FIG. 1 is a view showing a basic configuration (mainly the part of hybrid transmission unit) of a first embodiment in the WDM optical communication system according to the present invention. The WDM optical communication system according to the first embodiment comprises an optical fiber amplifier 10 for optically amplifying signals in the 1.58-μm wavelength band, and at least one hybrid transmission unit 100 disposed downstream from the optical fiber amplifier 10. The hybrid transmission unit 100 comprises a single-mode optical fiber (SMF: Single Mode Fiber) 11 and a dispersion-shifted optical fiber (DSF: Dispersion-Shifted Fiber) 12, in which the SMF 11 and the DSF 12 are successively disposed along the traveling direction of signal.

The optical fiber amplifier 10 comprises an amplification optical fiber whose core region is doped with Er element or the like, and pumping means for supplying a predetermined wavelength of pumping light to the amplification optical fiber. While the pumping light is being supplied to the amplification optical fiber by the pumping means, the optical fiber amplifier 10 collectively amplifies signals in the 1.58-μm wavelength band fed into the amplification optical fiber.

The SMF 11 disposed downstream from the optical fiber amplifier 10 has a zero-dispersion wavelength in the 1.3-μm wavelength band. The dispersion $D_{SMF}$ of SMF 11 at a wavelength of 1.58 μm is about 19 ps/nm/km in general. Here, $A_{SMF}$ refers to the effective area of SMF 11 at a wavelength of 1.58 μm.

On the other hand, the DSF 12 disposed downstream from the SMF 11 has a zero-dispersion wavelength in the 1.55-μm wavelength band. The absolute value of dispersion $D_{DSF}$ in the DSF 12 at a wavelength of 1.58 μm is 0.5 ps/nm/km or more but 5 ps/nm/km or less. The dispersion $D_{DSF}$ of DSF 12 is positive. The effective area $A_{DSF}$ of DSF 12 at a wavelength of 1.58 μm is smaller than the, effective area $A_{SMF}$ of the SMF 11.

Figure 2:
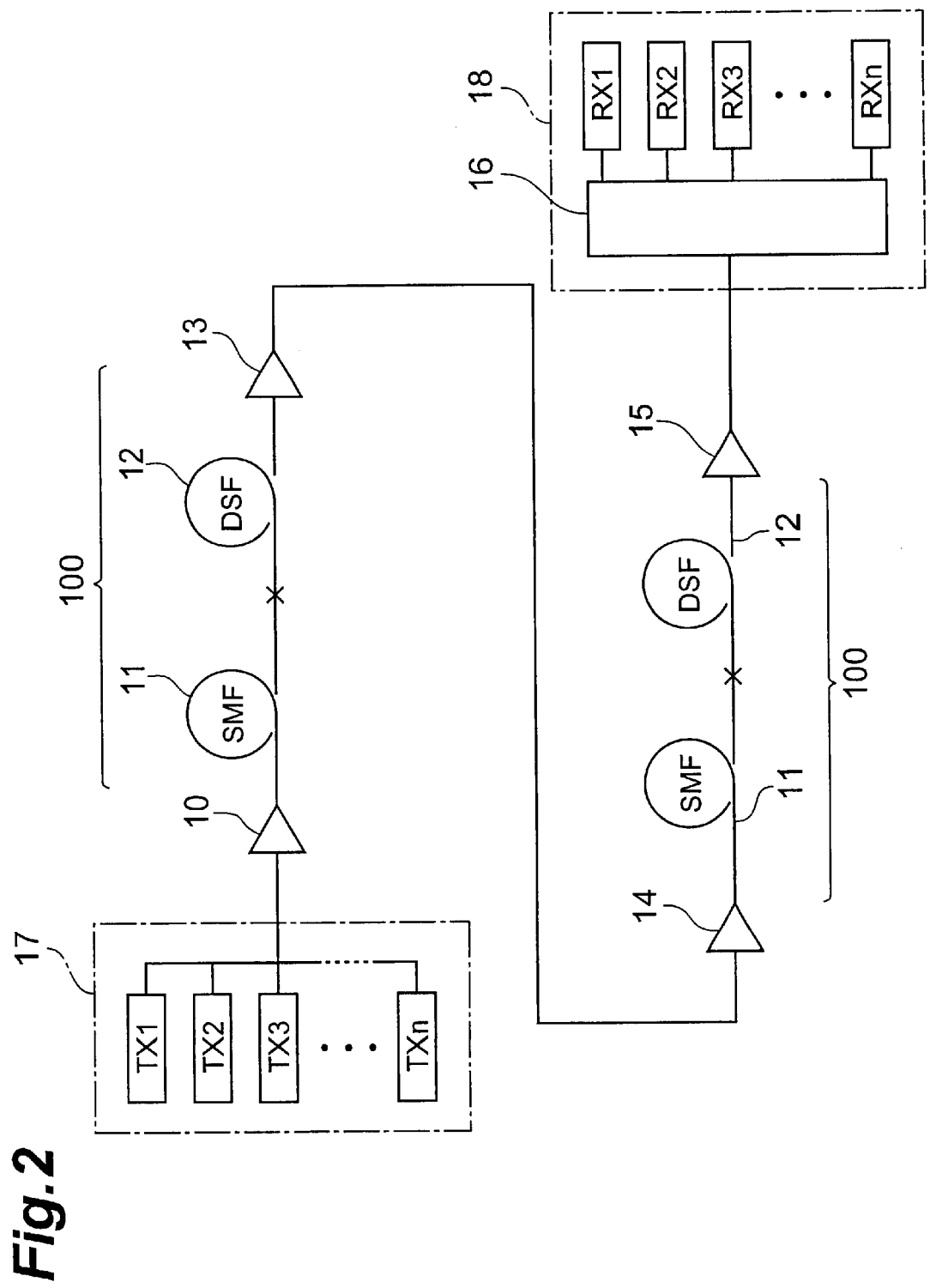
FIG. 2 is a view showing a specific configuration of the WDM optical transmission system according to the first embodiment shown in FIG. 1.

The WDM optical communication system according to the present invention may comprise a plurality of hybrid transmission units 100, each comprising the above-mentioned configuration, as shown in FIG. 2. In the WDM optical communication system of FIG. 2, the hybrid transmission units 100 are disposed between an optical transmitter 17 and an optical receiver 18, whereas a plurality of optical fiber amplifiers 10, 13, 14 are arranged on the entrance end side of the individual hybrid transmission units 100. Also, an optical fiber amplifier 15 and a demultiplexer 16 are disposed between the last-stage hybrid transmission unit 100 and the optical receiver 18.

Figure 3B:
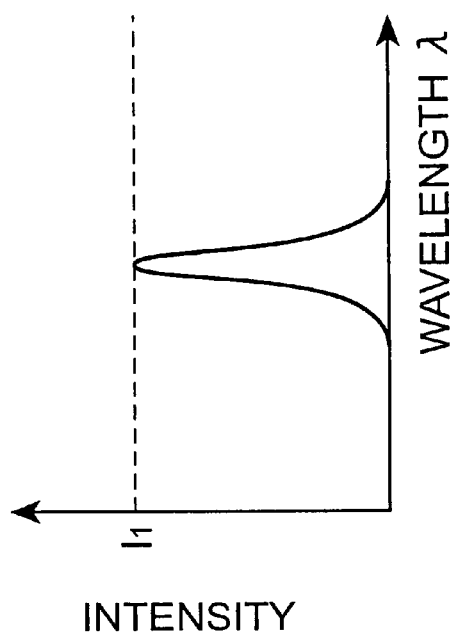
FIGS. 3A and 3B are charts showing the waveform of signal and its spectrum at the location indicated by arrow A in the WDM optical transmission system according to the first embodiment shown in FIG. 1, respectively.
Figure 3A:
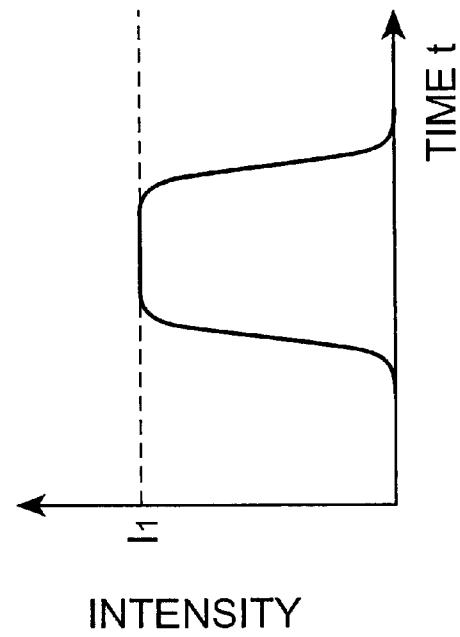
Figure 4B:
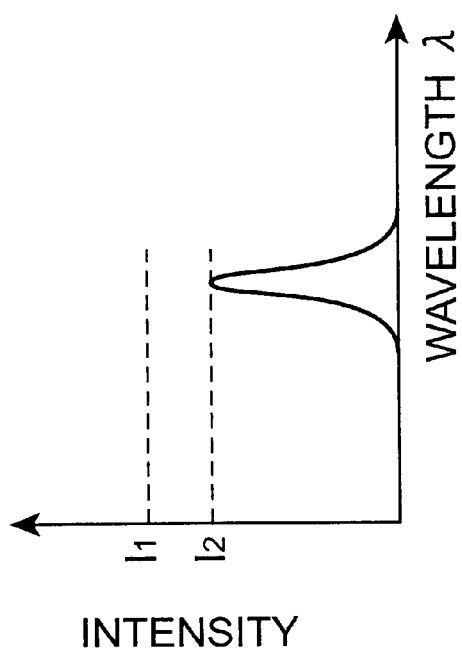
FIGS. 4A and 4B are charts showing the waveform of signal and its spectrum at the location indicated by arrow B in the WDM optical transmission system according to the first embodiment shown in FIG. 1, respectively.
Figure 4A:
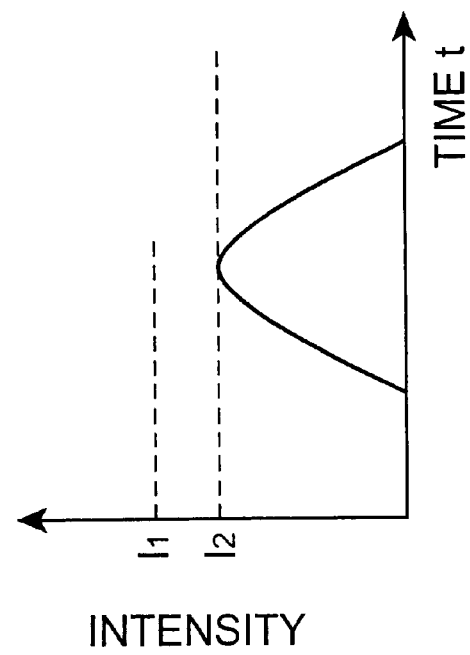
Figure 5B:
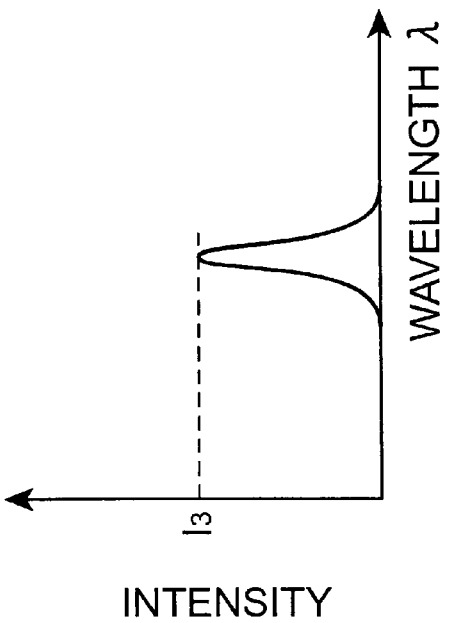
FIGS. 5A and 5B are charts showing the waveform of signal and its spectrum at the location indicated by arrow C in the WDM optical transmission system according to the first embodiment shown in FIG. 1, respectively.

FIGS. 3A to 5B are charts showing waveforms and spectra of signals in the WDM optical communication system according to the first embodiment shown in FIG. 1 at their corresponding locations. Specifically, FIGS. 3A and 3B are charts showing the waveform of signal and its spectrum at the location indicated by arrow A in the WDM optical transmission system according to the first embodiment shown in FIG. 1, respectively. FIGS. 4A and 4B are charts showing the waveform of signal and its spectrum at the location indicated by arrow B in the WDM optical transmission system according to the first embodiment shown in FIG. 1, respectively. FIGS. 5A and 5B are charts showing the waveform of signal and its spectrum at the location indicated by arrow C in the WDM optical transmission system according to the first embodiment shown in FIG. 1, respectively.

In the WDM optical communication system according to the first embodiment, the signals in the 1.58-μm wavelength band amplified by the optical fiber amplifier 10 initially propagate through the SMF 11, so as to reach the DSF 12. Here, since an NRZ pulse is assumed at the output end (location indicated by arrow A in FIG. 1) of the optical fiber amplifier 10 (ditto in the following), each signal has a substantially rectangular pulse form (see FIG. 3A) and a narrow spectrum width (see FIG. 3B).

The peak power of each signal at the output end (location indicated by arrow B in FIG. 1) of the SMF 11 is kept low because of its attenuation (see FIG. 4A). Also, since the SMF 11 has a relatively large effective area $A_{SMF}$ and a high dispersion $D_{SMF}$ therein, the occurrence of not only four-wave mixing but also cross-phase modulation is suppressed, so that the influence of interactions between wavelengths is lowered, whereby the widening of spectrum of each signal at the output end of the SMF 11 is sufficiently suppressed (see FIG. 4B).

Figure 5A:
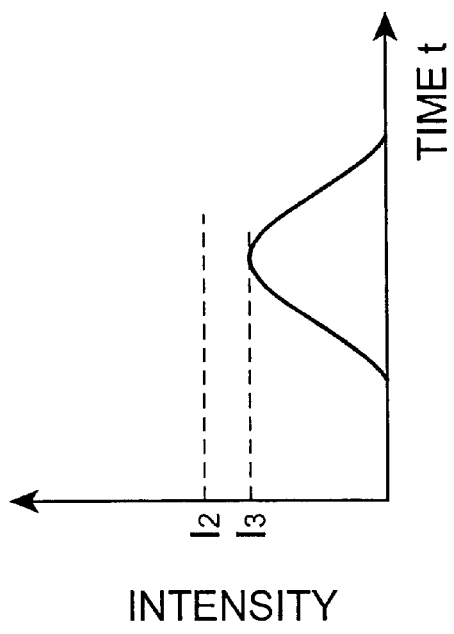
Figure 6B:
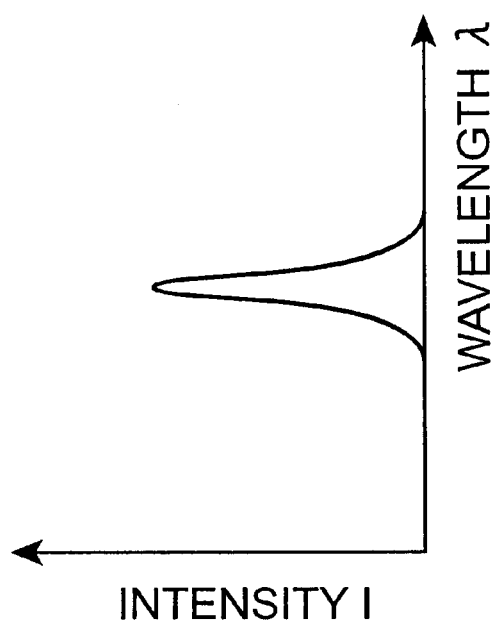
FIGS. 6A and 6B are charts showing the waveform of signal and its spectrum at the output end of an optical amplifier in a WDM optical communication system, acting as a comparative example, in which the optical amplifier, a dispersion-shifted optical fiber, and a single-mode optical fiber are successively arranged in the traveling direction of signal, respectively.
Figure 6A:
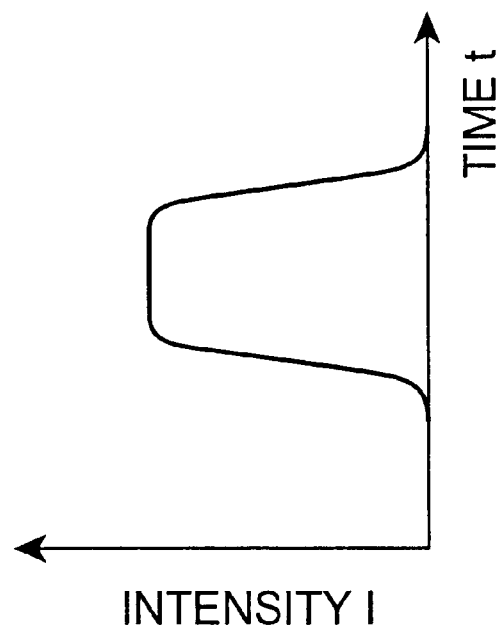
Figure 7B:
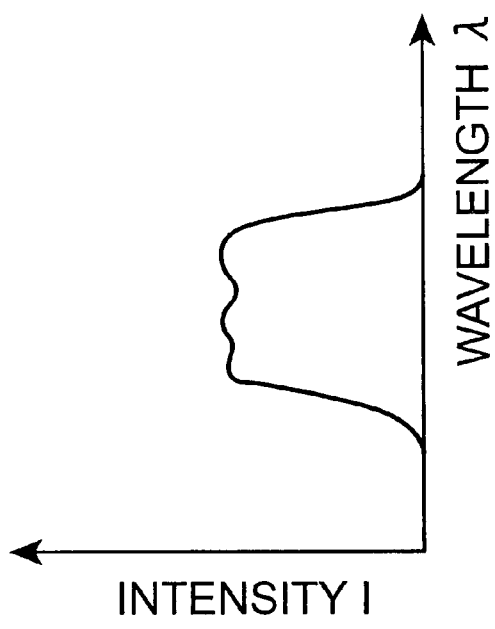
FIGS. 7A and 7B are charts showing the waveform of signal and its spectrum at the output end of the dispersion-shifted optical fiber in the WDM optical communication system, acting as the comparative example, in which the optical amplifier, the dispersion-shifted optical fiber, and the single-mode optical fiber are successively arranged in the traveling direction of signal, respectively.
Figure 7A:
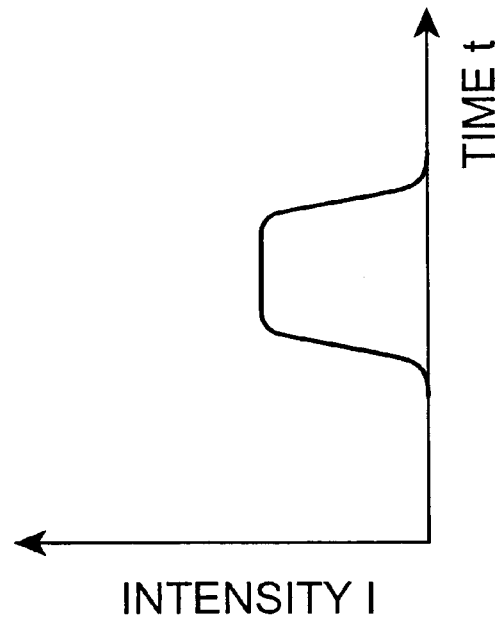

The signals emitted from the SMF 11 further attenuates when propagating through the DSF 12, whereby the peak power of each signal at the output end (location indicated by arrow C in FIG. 1) of the DSF 12 is further lowered (see FIG. 5A). Also, since the peak power of each signal propagating through the DSF 12 has already been lowered, nonlinear optical phenomena are hard to occur in the DSF 12 as well, whereby the widening of spectrum in each signal at the output end of the DSF 12 is kept small (see FIG. 5B).

Concerning a WDM optical communication system as a comparative example in which the SMF and DSF in FIG. 1 are exchanged, the pulse waveform and spectrum of each signal having a predetermined wavelength at individual points will be explained with reference to FIGS. 6A to 8B. In the WDM optical communication system of this comparative example, the signals in the 1.58-$\mu$m wavelength band amplified by the optical fiber amplifier reach the SMF after propagating through the DSF. As a consequence, the signals successively pass through the optical fiber amplifier, DSF, and SMF in the WDM optical communication system of the comparative example. At the output end of the optical fiber amplifier, each signal has a substantially rectangular pulse waveform (see FIG. 6A) and a narrow spectrum width (see FIG. 6B).

Subsequently, the signals emitted from the optical fiber amplifier propagate through the DSF. Since the DSF has such a low dispersion that the occurrence of four-wave mixing is sufficiently suppressed, the deterioration in pulse waveform of each of the signals is small (see FIG. 7A). However, the signals immediately after being emitted from the optical fiber amplifier (signals at the entrance end of DSF) have a high power, whereas the DSF has a relatively small effective area $A_{DSF}$, whereby nonlinear optical phenomena, such as cross-phase modulation in particular, are likely to occur, whereby the spectrum width of each signal at the output end of DSF widens (see FIG. 7B).

Figure 8B:
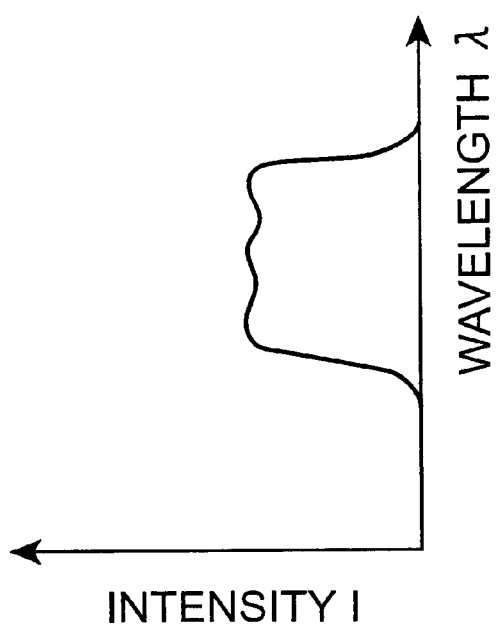
FIGS. 8A and 8B are charts showing the waveform of signal and its spectrum at the output end of the single-mode optical fiber in the WDM optical communication system, acting as the comparative example, in which the optical amplifier, the dispersion-shifted optical fiber, and the single-mode optical fiber are successively arranged in the traveling direction of signal, respectively.
Figure 8A:
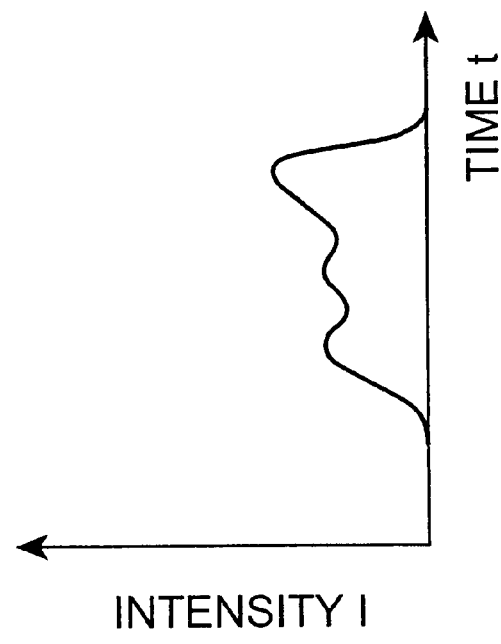

While the signals emitted from the DSF further propagate through the SMF, the pulse waveform of each signal having a wide spectrum drastically deteriorates since the SMF has a high dispersion (see FIG. 8A). On the other hand, each of the signals incident on the SMF has a relatively small power since it has already propagated through the DSF, whereas the SMF has a relatively large effective area $A_{SMF}$, so that nonlinear optical phenomena are hard to occur, whereby the change in spectrum width of each signal at the output end of SMF is small (see FIG. 8B).

Also, since the DSF having a zero-dispersion wavelength in the 1.55-$\mu$m wavelength band has a slight but positive dispersion in the 1.58-$\mu$m wavelength band, the pulse waveform of each of the signals propagating through the DSF tends to be compressed. Therefore, the deterioration in pulse waveform of each of signals becomes greater in the WDM optical communication system of the comparative example as compared with the case where signals propagate through an optical fiber having a negative dispersion with the same absolute value.

As in the foregoing, the WDM optical communication system of the comparative example (FIGS. 6A to 8B) comprises a configuration in which signals each having a high power enters the DSF having a small effective area $A_{DSF}$, whereby, nonlinear optical phenomena, such as cross-phase modulation in particular, are likely to occur. The deterioration in signals caused by nonlinear optical phenomena cannot be restored. The signals having widened its spectrum width due to nonlinear optical phenomena further propagate through its downstream SMF having a greater positive dispersion $D_{SMF}$, thereby incurring a greater waveform deterioration. By contrast, the WDM optical communication system according to this embodiment (FIGS. 1, 2, and 3A to 5B) is configured such that signals enter the DSF 12 after propagating through the SMF 11 having a large positive dispersion $D_{SMF}$. The SMF 11 has a low nonlinear characteristic though it has a high dispersion, whereby the signals propagating through the SMF 11 are hard to be influenced by nonlinear optical phenomena, such as cross-phase modulation in particular, though their pulse waveforms are slightly compressed. Also, since the peak power has already been lowered at the entrance end of the DSF 12, nonlinear optical phenomena, such as cross-phase modulation in particular, are hard to occur in the DSF 12. Since the dispersion $D_{DSF}$ is sufficiently low, on the other hand, further waveform deterioration is also hard to occur. In addition, the deterioration in pulse waveform of signal resulting from the positive dispersion in the SMF 11 can also be compensated for by a dispersion compensator such as dispersion-shifted optical fiber.

For fully attaining the above-mentioned effects in the WDM optical communication system according to the first embodiment, it is preferred that the length of the SMF 11 (having a transmission loss of about 0.2 dB/km) be 10 km or more. As a consequence, the amount of attenuation of signals propagating through the SMF 11 becomes 2 dB or more, whereby the power of each signal at the entrance end of the DSF 12 can sufficiently be reduced to such an extent that nonlinear optical phenomena do not occur in the DSF 12.

Preferably, the SMF 11 has a polarization mode dispersion of 2 ps·km$^{-\frac{1}{2}}$ or less at a wavelength of 1.58 $\mu$m, and the DSF 12 has a polarization mode dispersion of 2 ps·km$^{-\frac{1}{2}}$ or less at a wavelength of 1.58 $\mu$m.

Also, letting B be the bit rate, it is preferred that the cumulative polarization dispersion of the hybrid transmission unit 100 as a whole at a wavelength of 1.58 $\mu$m be 1/(4B) or less. Cross-phase modulation depends on the polarization state of signals, such that it is maximized when the respective polarized waves at two wavelengths of signal coincide with each other and is minimized when they are orthogonal to each other. If the polarization mode dispersion is higher, then individual signals are more likely to change relative polarization states therebetween while propagating through a fiber, whereby the transmission characteristics of the WDM optical communication system fluctuate depending on the state of signals at the time when entering the fiber. Also, as the bit rate B is greater, the polarization state effectively changes more between individual signals. Therefore, if the polarization mode dispersion of each of the SMF 11 and DSF 12 or the cumulative polarization dispersion of the whole hybrid transmission unit 100 including the optical fibers 11, 12 is set as mentioned above in this embodiment, then cross-phase modulation depending on the polarization state of signals and the waveform deterioration resulting from dispersion can further be lowered. Also, the whole cumulative polarization dispersion can be improved if a polarization dispersion compensator is inserted into the WDM optical communication system.

In general, in the case where each signal outputted from the optical fiber amplifier has a power of 3 dBm or more, nonlinear optical phenomena are likely to occur in a DSF if the signals immediately enter the DSF. Also, nonlinear optical phenomena are likely to occur when individual signals have a channel spacing of 200 GHz or less or each signal has a bit rate of 600 Mb/s or greater. Even in such a case, however, since the SMF 11 is disposed between the output end of the optical fiber amplifier 10 and the DSF 12, each signal is kept from deteriorating due to nonlinear optical phenomena.

Figure 9:
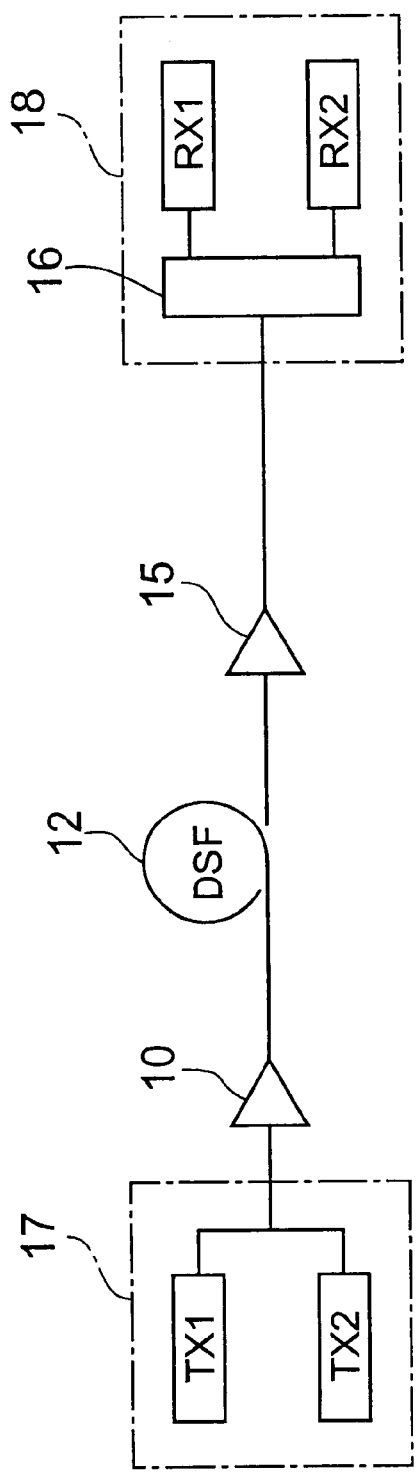
FIG. 9 is a view showing the configuration of a system-evaluating model for computing the transmission quality of a dispersion-shifted optical fiber applicable to the WDM optical communication system according to the present invention.

The transmission quality of a DSF suitable for the WDM optical communication system according to the present invention will now be explained. FIG. 9 is a view showing the configuration of a system-evaluating model for computing the transmission quality of a dispersion-shifted optical fiber applicable to the WDM optical communication system according to the present invention. On the other hand, FIGS. 10A to 10C are graphs for evaluating the transmission quality of the dispersion-shifted optical fiber in the model shown in FIG. 9.

The evaluating system of FIG. 9 is constituted by an optical transmitter 17 for emitting two wavelengths of signals, an optical fiber amplifier 10 for amplifying the signals from the optical transmitter 17, a DSF 12 for transmitting the signals from the optical transmitter 17, an optical fiber amplifier 15 for amplifying the signals emitted from the DSF 12, and an optical receiver 18 for receiving the two wavelengths of signal by way of a demultiplexer 16.

Figure 10A:
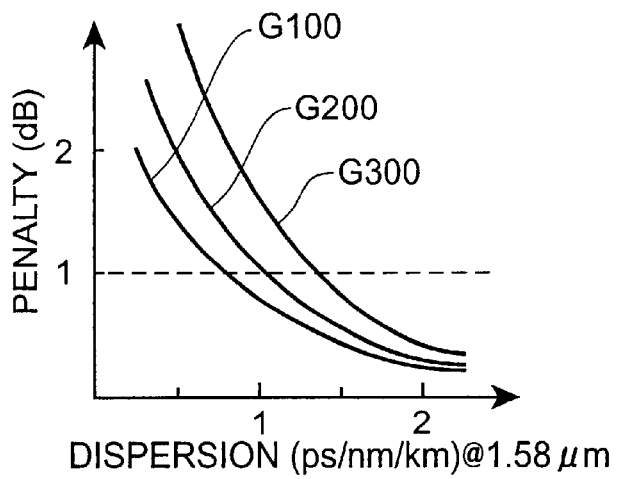
FIGS. 10A to 10C are graphs for evaluating the transmission quality of the dispersion-shifted optical fiber in the model shown in FIG. 9, showing the relationship between the dispersion value (ps/nm/km) at a wavelength of 1.58 μm and penalty (dB) for each channel spacing, the relationship between the optical power (dBm) per channel and dispersion value (ps/nm/km) at a wavelength of 1.58 μm for each permissible penalty (dB), and the relationship between a parameter $P/(D \cdot CS)[\times 10^{13} (W \cdot m)/s]$ and penalty (dB) regarding to the number of channels (number of signals), respectively.

FIG. 10A is a graph showing the relationship between the dispersion value D (ps/nm/km) at a wavelength of 1.58 μm and penalty (dB) when two signals each having a power of 10 dBm are propagated at a bit rate of 10 Gb/s in the evaluating system of FIG. 9. Here, G100 is a curve obtained when the channel spacing CS is 200 GHz, G200 is a curve obtained when the channel spacing CS is 100 GHz, and G300 is a curve obtained when the channel spacing CS is 50 GHz. As can be seen from these curves, penalty (dB) becomes greater as the channel spacing is narrower even when the dispersion value is the same.

Figure 10B:
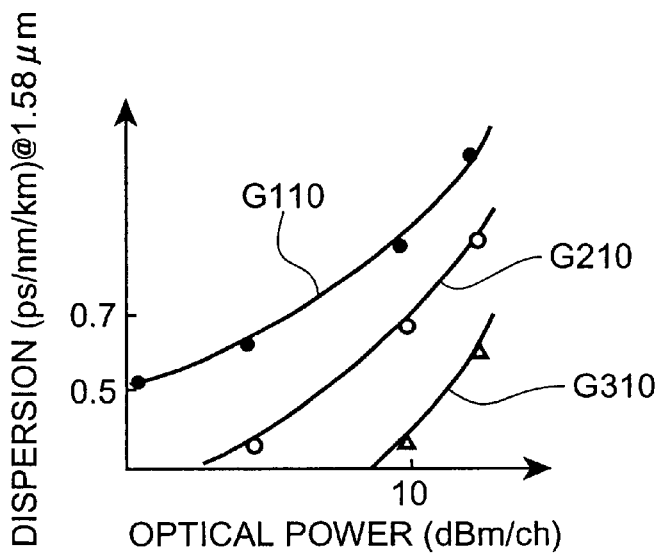
Figure 10C:
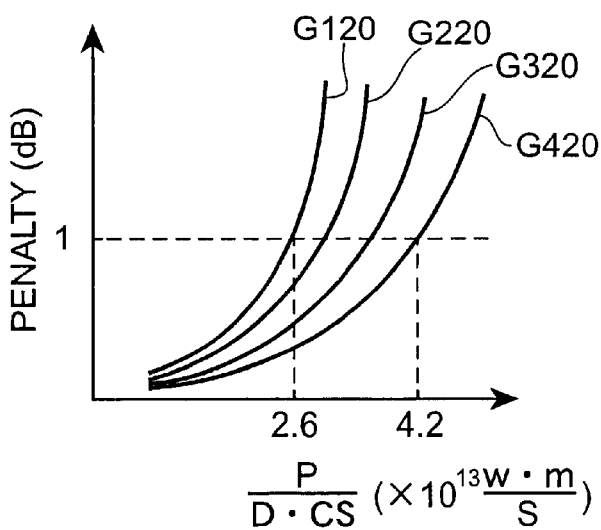

FIG. 10B shows the relationship between the optical power (dBm) per channel and dispersion value (ps/nm/km) at a wavelength of 1.58 μm for each penalty (dB) when the channel spacing CS is fixed at 50 GHz. Here, G110 is a curve obtained when the penalty is 1 dB, G210 is a curve obtained when the penalty is 3dB, and G310 is a curve obtained when the penalty is 6 dB. When these curves G110 to G310 are determined by approximate curves, the following relationship is obtained:

$$\frac{P}{D \cdot CS} \leq 4.2 \times 10^{13} [(W \cdot m)/s]$$

where

P is the optical power (W) per channel;

D is the dispersion value (ps/nm/km) at a wavelength of 1.58 μm; and

CS is the channel spacing (nm).

Here, if signals with a channel spacing CS of 50 GHz (nearly equal to 0.4 nm) enters the DSF 12, while the dispersion value at a wavelength of 1.58 μm is 1 (ps/nm/km), then the maximum signal power $P_{max}$ tolerable by the DSF 12 will be 16.8 mW (=1.68×10⁻² W).

FIG. 10C shows the relationship between a parameter P/(D·CS)[×10¹³(W·m)/s] and penalty (dB) when the number (number of channels) of signals entering the DSF 12 is changed. In this graph, G120 is a curve obtained when the number of signals is set to 128, G220 is a curve obtained when the number of signals is set to 32, G320 is a curve obtained when the number of signals is set to 8, and G420 is a curve obtained when the number of signals is set to 2.

For suppressing the penalty to 1 dB or less, as can be seen from these curves G120 to G420, it is necessary that the parameter P/(D·CS) be set so as to become smaller as the number of channels (number of signals) increases. In particular, if the condition of $$\frac{P}{D \cdot CS} \leq 2.6 \times 10^{13} [(W \cdot m)/s]$$

is satisfied, then the total length of the WDM optical communication system can be elongated without carrying out dispersion compensation even in optical communications of 128 channels.

Second Embodiment

Figure 11:
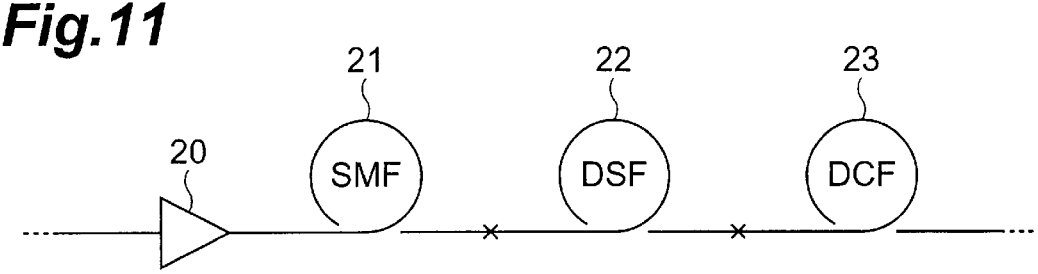
FIG. 11 is a view showing a basic configuration (mainly the part of hybrid transmission unit) of a second embodiment in the WDM optical communication system according to the present invention.

A second embodiment of the WDM optical communication system according to the present invention will now be explained. FIG. 11 is a view showing a basic configuration of the second embodiment of the WDM optical communication system according to the present invention. The WDM optical communication system according to the second embodiment comprises an optical fiber amplifier 20 for amplifying signals in the 1.58-μm wavelength band, and a hybrid transmission unit 100 disposed downstream from the optical fiber amplifier 20. The hybrid transmission unit 100 comprises a single-mode optical fiber (SMF) 21 disposed downstream from the optical fiber amplifier 20, a dispersion-shifted optical fiber (DSF) disposed downstream from the SMF 21, and a dispersion-compensating optical fiber (DCF: Dispersion Compensating Fiber) 23 disposed downstream from the DSF 22. The optical fiber amplifier 20, SMF 21, and DSF 22 in the second embodiment have transmission characteristics similar to those of the optical fiber amplifier 10, SMF 11, and DSF 12 in the first embodiment. The DCF 23 disposed downstream from the DSF 22 compensates for the cumulative dispersion of the SMF 21 and DSF 22 in the 1.58-μm wavelength band. The dispersion $D_{DCF}$ of the DCF 23 at a wavelength of 1.58 μm is negative, whereas its absolute value is about several tens to several hundreds of ps/nm/km, thereby being greater than the absolute value of the dispersion $D_{DSF}$ of the DSF 22.

In the WDM optical communication system according to the second embodiment, the signals in the 1.58-μm wavelength band amplified by the optical fiber amplifier 20 propagate through the DSF 22 after propagating through the SMF 21. Then, the signals emitted from the DSF 22 propagate through the DCF 23. At the output end of the optical fiber amplifier 20, each signal is assumed to have a substantially rectangular pulse waveform and a narrow spectrum width.

The peak power of each signal at the output end of the SMF 21 is kept low because of its attenuation. Also, since the SMF 21 has a relatively large effective area $A_{SMF}$ nonlinear optical phenomena are hard to occur in the SMF 21, so that the spectrum width of each signal is kept narrow at the output end of the SMF 21. Further, since the SMF 21 has a relatively large effective area $A_{SMF}$ and a high dispersion $D_{SMF}$ therein, the occurrence of not only four-wave mixing but also cross-phase modulation is suppressed, so that the influence of interactions between wavelengths is lowered, whereby the widening of spectrum and deterioration of waveform in each signal at the output end of the SMF 21 are sufficiently suppressed. On the other hand, since each signal propagating through the DSF 22 has already lowered its power as it has propagated through the SMF 21, nonlinear optical phenomena are hard to occur in the DSF 22 as well, whereby the waveform deterioration of each signal at the output end of the DSF 22 is kept small.

The positive dispersion $D_{SMF}$ of the SMF 21 is compensated for by the negative dispersion $D_{DCF}$ of the DCF 23, whereby the pulse waveform of each signal is restored while each signal propagates through the DCF 23. Also, since the peak power of each signal having entered the DCF 23 has already been made sufficiently smaller, nonlinear optical phenomena are hard to occur in the DCF 23, in spite of the fact that the effective area $A_{DCF}$ of the DCF 23 is considerably small, whereby the spectrum width of each signal at the output end of the DCF 23 is kept narrow (suppression of waveform deterioration).

As in the foregoing, the second embodiment comprises a structure in which, while the pulse waveform of each signal is compressed by the SMF 21 having a large positive dispersion $D_{SMF}$, the peak power lowers as a whole, whereby nonlinear optical phenomena (such as cross-phase modulation in particular) are hard to occur in the DCF 22. Also, the compression of pulse waveform in each signal resulting from the positive dispersion in the SMF 21 is compensated for by the negative dispersion of the DCF 23.

For fully attaining the above-mentioned effects in the WDM optical communication system according to the second embodiment, it is preferred that the length of the SMF 21 be 10 km or more. As a consequence, the amount of attenuation of each signal propagating through the SMF 21 becomes 2 dB or more, whereby the power of each signal entering the DSF 22 can sufficiently be reduced to such an extent that nonlinear optical phenomena do not occur in the DSF 22.

Preferably, the SMF 21 has a polarization mode dispersion of 2 ps·km$^{-\frac{1}{2}}$ or less at a wavelength of 1.58 μm, and the DSF 22 has a polarization mode dispersion of 2 ps·km$^{-\frac{1}{2}}$ or less at a wavelength of 1.58 μm in the WDM optical communication system according to the second embodiment as well. Also, letting B be the bit rate, it is preferred that the cumulative polarization dispersion of the hybrid transmission unit 100 as a whole at a wavelength of 1.58 μm be 1/(4B) or less. As a consequence, cross-phase modulation depending on the polarization state of signals and the waveform deterioration resulting from dispersion can further be lowered.

Third Embodiment

Figure 12:
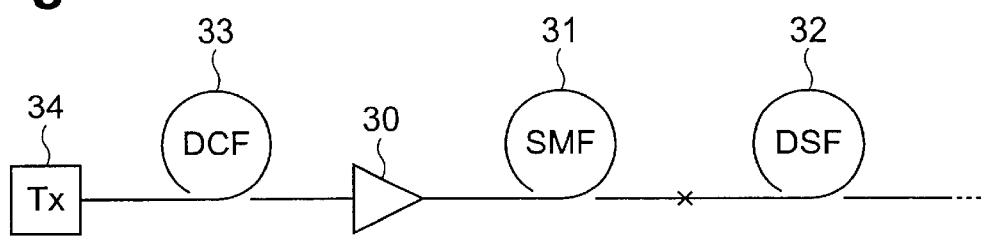
FIG. 12 is a view showing a basic configuration (mainly the part of hybrid transmission unit) of a third embodiment in the WDM optical communication system according to the present invention.

A third embodiment of the WDM optical communication system according to the present invention will now be explained. FIG. 12 is a view showing a basic configuration of the WDM optical communication system according to the third embodiment. The WDM optical communication system according to the third embodiment comprises an optical transmitter 34 for emitting signals in the 1.58-μm wavelength band, and a hybrid transmission unit 100 disposed downstream from the transmitter 34. The hybrid transmission unit 100 comprises a dispersion-compensating optical fiber (DCF) 33, disposed downstream from the transmitter 34 for amplifying the signals in the 1.58-μm wavelength band; an optical fiber amplifier 30, disposed downstream from the DCF 33, for amplifying the signals in the 1.58-μm wavelength band; a single-mode optical fiber (SMF) 31 disposed downstream from the optical fiber amplifier 30 and a dispersion-shifted optical fiber (DSF) 32 disposed downstream from the SMF 31. The optical fiber amplifier 30, SMF 31, DSF 32, and DCF 33 in the third embodiment have transmission characteristics similar to those of the optical fiber amplifier 20, SMF 21, DSF 22, and DCF 23 in the second embodiment, whereas the third embodiment differs from the second embodiment in that the DCF 33 is disposed between the optical transmitter 34 and the optical fiber amplifier 30.

In the WDM optical communication system according to the third embodiment, the signals in the 1.58-μm wavelength band emitted from the optical transmitter 34 are amplified by the optical fiber amplifier 30 after propagating through the DCF 33. Subsequently, the signals emitted from the optical fiber amplifier 30 propagate through the SMF 31 and then through the DSF 32. It is assumed that, at the point in time when emitted from the optical transmitter 34, each signal has a substantially rectangular pulse waveform and a narrow spectrum width.

Thereafter, while propagating through the DCF 33 having a large negative dispersion $D_{DCF}$, each signal widens its pulse width, thereby effectively lowering its peak power. On the other hand, since the signals emitted from the optical transmitter 34 have a sufficiently small power, the occurrence of nonlinear optical phenomena is suppressed in the DCF 33 in spite of the fact that the effective area $A_{DCF}$ of the DCF 33 is relatively small, whereby each signal can be restrained from deteriorating its waveform at the output end of the DCF 33.

The signals each having entered the optical fiber amplifier 30 from the DSF 33 enter the SMF 31 after being amplified by the optical fiber amplifier 30. The peak power of each signal at the output end of the SMF 31 is kept low because of its attenuation. Also, since the SMF 31 has a relatively large effective area $A_{SMF}$ and a high dispersion $D_{SMF}$ therein, the occurrence of not only four-wave mixing but also cross-phase modulation is suppressed. As a consequence, the widening of spectrum and waveform deterioration of each signal at the output end of the SMF 31 are sufficiently suppressed.

Since each signal propagating through the DSF 32 has already lowered its power as it has propagated through the SMF 31, nonlinear optical phenomena are hard to occur in the DSF 32 as well, whereby the waveform deterioration of signal at the output end of the DSF 32 is suppressed. Also, as each of the signals having passed through the DCF 33 successively propagates through the SMF 31 and DSF 32, its dispersion is compensated for, whereby its pulse waveform is restored.

As in the foregoing, the third embodiment comprises a configuration in which, though the pulse waveform of signal is slightly compressed by the SMF 31 having a large positive dispersion $D_{SMF}$, the peak power decreases as a whole, whereby nonlinear optical phenomena, such as cross-phase modulation in particular, are hard to occur. Also, as each of the signals having passed through the DCF 33 successively propagate through the SMF 31 and DSF 32, its dispersion is compensated for, whereby its pulse waveform is restored.

In particular, the DCF 33 is disposed upstream from the optical fiber amplifier 30 in the third embodiment. Since the DCF 33 has a very high nonlinear characteristic and a very large dispersion, the upper limit for the power of each signal which can propagate therethrough is low. However, since the DCF 33 is disposed upstream from the optical fiber amplifier 30, whereas the power of each signal propagating through the DCF 33 is low, nonlinear optical phenomena are effectively restrained from occurring in the DCF 33, whereby waveform is prevented from deteriorating.

Further, in the third embodiment, the DCF 33 is disposed between the optical transmitter 34 and the optical fiber amplifier 30. The signals emitted from the optical transmitter 34 reach the optical fiber amplifier 30 after the DCF 33 having a large negative dispersion widens the pulse waveform and effectively lowers the peak power. Therefore, as compared with the system configuration not employing the DCF 33, signals each having a lower peak power would propagate through the SMF 31 and DSF 32, whereby nonlinear optical phenomena can be restrained from occurring in DSF 32 in this regard as well (prevention of waveform deterioration).

For fully attaining the above-mentioned effects in the WDM optical communication system according to the third embodiment, it is preferred that the length of the SMF 31 be 10 km or more. As a consequence, the power of signal light entering the DSF 32 can sufficiently be reduced to such an extent that nonlinear optical phenomena do not occur in the DSF 32.

Preferably, the SMF 31 has a polarization mode dispersion of 2 ps·km$^{-\frac{1}{2}}$ or less at a wavelength of 1.58 μm, the DSF 32 has a polarization mode dispersion of 2 ps·km$^{-\frac{1}{2}}$ or less at a wavelength of 1.58 μm, and the DCF 33 has a polarization mode dispersion of 2 ps·km$^{-\frac{1}{2}}$ or less at a wavelength of 1.58 μm in the WDM optical communication system according to the third embodiment as well. Also, letting B be the bit rate, it is preferred that the cumulative polarization dispersion of the hybrid transmission unit 100 as a whole at a wavelength of 1.58 μm be 1/(4B) or less. As a consequence, cross-phase modulation depending on the polarization state of signals and the waveform deterioration resulting from dispersion can further be lowered.

Fourth Embodiment

Figure 13:
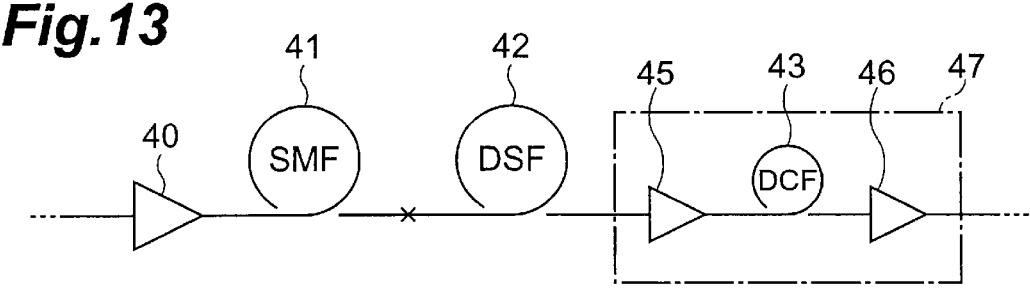
FIG. 13 is a view showing a basic configuration (mainly the part of hybrid transmission unit) of a fourth embodiment in the WDM optical communication system according to the present invention.

A fourth embodiment of the WDM optical communication system according to the present invention will now be explained. FIG. 13 is a view showing a basic configuration of the WDM optical communication system according to the fourth embodiment. The WDM optical communication system according to the fourth embodiment comprises an optical fiber amplifier 40 for amplifying signals in the 1.58-μm wavelength band, and a hybrid transmission unit 100 disposed downstream from the optical fiber amplifier 40. The hybrid transmission unit 100 comprises a single-mode optical fiber (SMF) 41 disposed downstream from the optical fiber amplifier 40, a dispersion-shifted optical fiber (DSF) 42 disposed downstream from the SMF 41, and a repeater 47 disposed downstream from the DSF 42. The repeater 47 comprises an optical fiber amplifier 45, a dispersion-compensating optical fiber (DCF) 43 disposed downstream therefrom, and an optical fiber amplifier 46 disposed downstream from the DCF 43. The optical fiber amplifier 40, SMF 41, DSF 42, and DCF 43 have transmission characteristics similar to those of the optical fiber amplifier 20, SMF 21, DSF 22, and DCF 23 in the second embodiment, whereas the fourth embodiment differs from the second embodiment in that the DCF 43 is disposed between the optical fiber amplifier 45 disposed downstream from the DSF 42 and the optical fiber amplifier 46.

The operations and effects in the WDM optical communication system according to the fourth embodiment until A the signals in the 1.58-μm wavelength band emitted from the optical fiber amplifier 40 successively propagate through the SMF 41 and DSF 42 are similar to those in the first embodiment. The pulse waveform and spectrum of each signal at the output end of the DSF 42 are similar to those shown in FIGS. 5A and 5B, respectively.

In the fourth embodiment, the signals emitted from the DSF 42 further enters the repeater 47. Each of the signals having entered the repeater 47 is initially amplified by the optical fiber amplifier 45 and then enters the DCF 43. Since the DCF 43 has a negative dispersion $D_{DCF}$, the positive dispersion $D_{SMF}$ of the SMF 41 is compensated for thereby. While the signals propagate through the DCF 43, the pulse waveform of each signal is reproduced and attenuated to a certain extent. When the gain of the optical fiber amplifier 45 is set relatively low, the peak power of each signal having entered the DCF 43 can be kept low. As a consequence, nonlinear optical phenomena are hard to occur in the DCF 43 in spite of the fact that the DCF 43 has a considerably small effective area $A_{DCF}$, whereby the waveform deterioration of each signal at the output end of the DCF 43 is effectively suppressed. Further, the signals emitted from the DCF 43 enter the optical fiber amplifier 46 and are amplified thereby. Thus, the signals amplified by the optical fiber amplifier 46 are eventually emitted from the repeater 47.

As in the foregoing, the fourth embodiment comprises a configuration in which, though the pulse waveform of each signal is compressed by the SMF 41 having a large positive dispersion $D_{SMF}$, the peak power lowers as a whole, whereby nonlinear optical phenomena, such as cross-phase modulation in particular, are hard to occur in the DSF 42. Also, the deterioration in pulse waveform of each signal resulting from the positive dispersion in the SMF 41 is compensated for by the negative dispersion of the DCF 43.

For fully attaining the above-mentioned effects in the WDM optical communication system according to the fourth embodiment, it is preferred that the length of the SMF 41 be 10 km or more. As a consequence, the amount of attenuation of each signal propagating through the SMF 41 becomes 2 dB or more, whereby the power of each signal entering the DSF 42 can sufficiently be reduced to such an extent that nonlinear optical phenomena do not occur in the DSF 42.

Preferably, the SMF 41 has a polarization mode dispersion of 2 ps·km$^{-\frac{1}{2}}$ or less at a wavelength of 1.58 μm, the DSF 42 has a polarization mode dispersion of 2 ps·km$^{-\frac{1}{2}}$ or less at a wavelength of 1.58 μm, and the DCF 43 has a polarization mode dispersion of 2 ps·km$^{-\frac{1}{2}}$ or less at a wavelength of 1.58 μm in the WDM optical communication system according to the fourth embodiment as well. Also, letting B be the bit rate, it is preferred that the cumulative polarization dispersion of the hybrid transmission unit 100 as a whole at a wavelength of 1.58 μm be 1/(4B) or less. As a consequence, cross-phase modulation depending on the polarization state of signals and the waveform deterioration resulting from dispersion can further be lowered.

In particular, the DCF 43 is disposed between the optical fiber amplifiers 45 and 46 within the repeater 47 in the fourth embodiment. In such a configuration, the signals emitted from the optical fiber amplifier 40 successively propagate through the SMF 41 and DSF 42, thereby temporarily lowering its power. After being recovered to a certain extent by the optical fiber amplifier 45, the power is lowered as each of the signals propagates through the DCF 43. Then, the power is completely restored by the optical fiber amplifier 46. Here, the gain in the optical fiber amplifier 45 is such that the occurrence of nonlinear optical phenomena in the DCF 43 is not problematic. Therefore, while the loss in the DCF 43 is being compensated for, waveform can be prevented from deteriorating in the DCF 43. Also, relatively favorable transmission characteristics can be obtained in the DCF 43 even when only the cumulative dispersion of the SMF 41 is compensated for.

When an Er-doped optical fiber amplifier (EDFA) for amplifying signals in the 1.58-μm wavelength band is employed for each of the optical fiber amplifiers 45, 46, a configuration including the DCF 43 can be designed beforehand, whereby the gain deviation (wavelength dependence) of the repeater 47 in this signal wavelength band can easily be made flat. In a WDM optical communication system in which a plurality of repeaters are disposed at predetermined intervals, the degree of nonlinear deterioration heavily depends on wavelength if the gain deviation is large in each repeater. In the fourth embodiment, however, the gain deviation can easily be made flat, whereby the wavelength dependence of nonlinear deterioration can be made smaller in the system as a whole.

Figure 14:
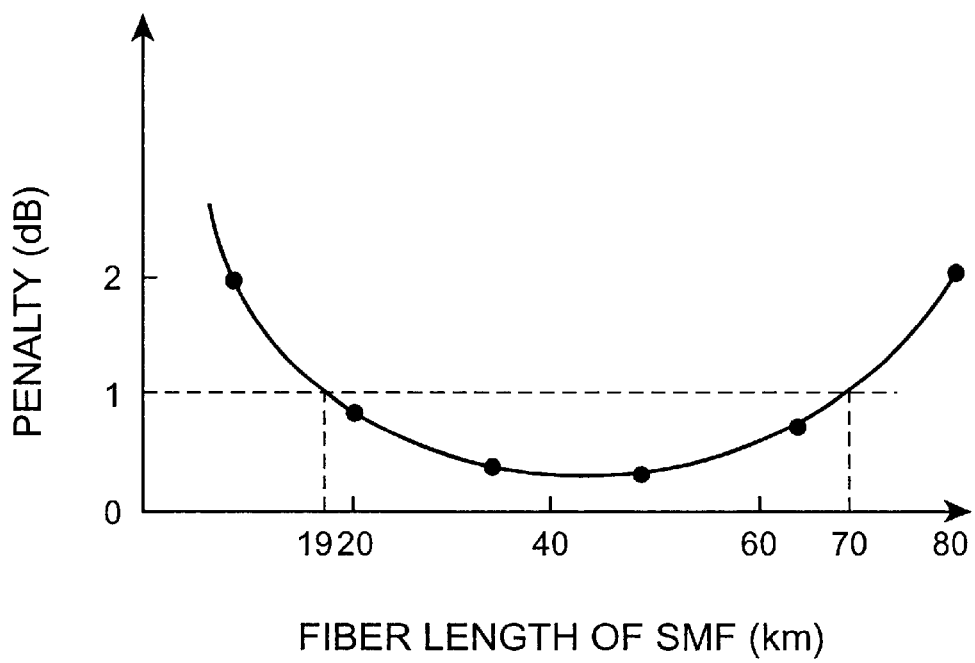
FIG. 14 is a graph showing the relationship between the fiber length (km) of single-mode optical fiber and penalty (dB) in the WDM optical communication system shown in FIG. 2.

Results of an evaluation concerning the relationship between the total length of each hybrid transmission unit 100 and the SMF 11 in the WDM optical communication system shown in FIG. 2 will now be explained. FIG. 14 is a graph showing the relationship between the fiber length (km) of single-mode optical fiber and penalty (dB) in the WDM optical communication system shown in FIG. 2.

In this evaluation, the length of the hybrid transmission unit 100, the output of each of the optical fiber amplifier 10, 13, 14, 15, and the bit rate were set to 80 km, 10 dBm/ch, and 2.5 GHz, respectively. In each hybrid transmission unit 100, the SMF 11 was a single-mode optical fiber having a zero-dispersion wavelength in the 1.3-μm wavelength band, whereas the DSF 12 was a dispersion-shifted optical fiber having a zero-dispersion wavelength in the 1.55-μm wavelength band. As the signals, first signals each having a wavelength of 1580 nm and second signals each having a wavelength of 1580.4 nm (with a channel spacing of 0.4 nm therebetween) were utilized.

It can be seen that, under the foregoing condition, a high transmission quality can be obtained when the fiber length of the SMF 11 is set to about 40 km as shown in FIG. 14. A practically unproblematic degree of transmission quality is obtained if the fiber length is 19 km or more but 70 km or less. If the fiber length of SMF 11 is shorter than 19 km, on the other hand, then the power of each signal entering the DSF 12 is so high that waveform deteriorates due to nonlinear optical phenomena. If the fiber length of SMF 11 exceeds 70 km, by contrast, then the waveform deterioration resulting from the cumulative dispersion in the SMF 11 becomes remarkable. However, these results are obtained only under the above-mentioned condition and do not specifically indicate a preferred fiber length of the SMF 11. For example, even when the fiber length of SMF 11 is shorter than 19 km, the transmission quality of the whole system can be improved if the amplified output of the optical fiber amplifier is lowered. Also, the transmission quality of the whole system can be improved, even when the fiber length of SMF 11 exceeds 70 km, if dispersion compensating means such as dispersion-compensating optical fiber is disposed in the WDM optical communication system as appropriate.

Fifth Embodiment

Figure 15:
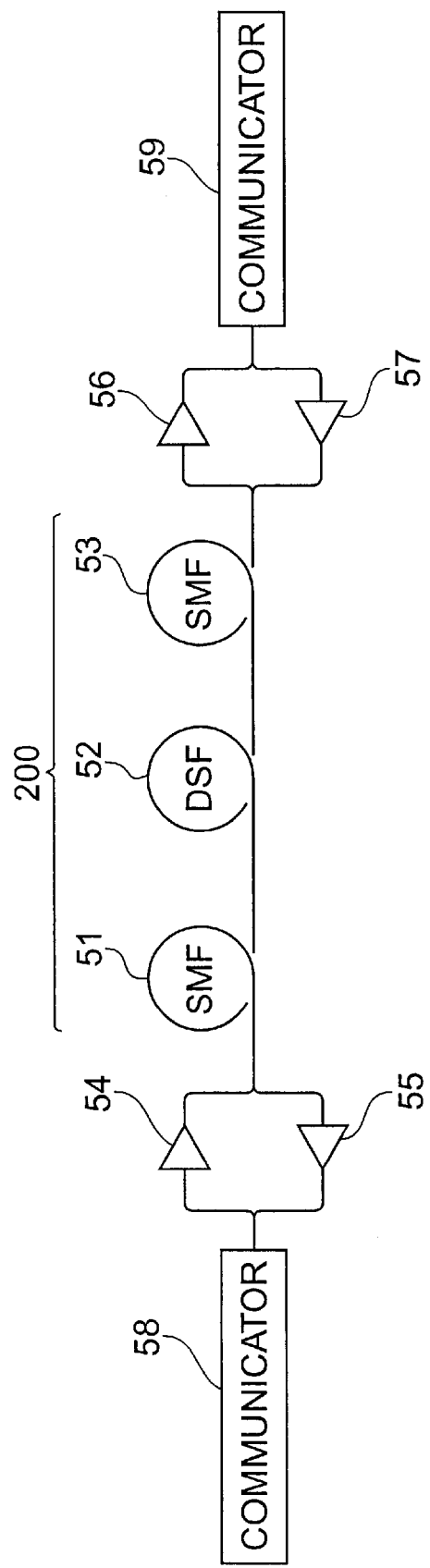
FIG. 15 is a view showing a basic configuration (mainly the part of hybrid transmission unit) of a fifth embodiment in the WDM optical communication system according to the present invention.

A fifth embodiment of the WDM optical communication system according to the present invention will now be explained. FIG. 15 is a view showing a basic configuration of the fifth embodiment in the WDM optical communication system according to the present invention. The WDM optical communication system according to the fifth embodiment comprises a configuration capable of bidirectional optical communications. Specifically, at least one hybrid optical transmission unit 200 is disposed between communicators 58, 59 (or repeaters). Disposed between the hybrid transmission unit 200 and the communicator 58 are an optical fiber amplifier 55 for amplifying the signals directed to the communicator 58 from the hybrid transmission unit 200 and an optical fiber amplifier 54 for amplifying the signals directed to the hybrid transmission unit 200 from the communicator 58. Disposed between the hybrid transmission unit 200 and the communicator 59 are an optical fiber amplifier 56 for amplifying the signals directed to the communicator 59 from the hybrid transmission unit 200 and an optical fiber amplifier 57 for amplifying the signals directed to the hybrid transmission unit 200 from the communicator 59.

The hybrid transmission unit 200 comprises a dispersion-shifted optical fiber 52 (DSF) having a zero-dispersion wavelength in the 1.55-μm wavelength band; and single-mode optical fibers 51, 53, each having a zero-dispersion wavelength in the 1.3-μm wavelength band, disposed so as to hold the DSF 52 therebetween. As a consequence of this configuration, the signals transmitted between the communicators 58, 59 by way of the hybrid transmission unit 200 always pass through any of the SMFs 51, 53, whereby any of the SMFs 51, 53, functions as an attenuator. The DSF 52 and SMFs 51, 53 in the first embodiment have transmission characteristics similar to those of the SMF 11 and DSF 12 in the first embodiment.

Figure 16:
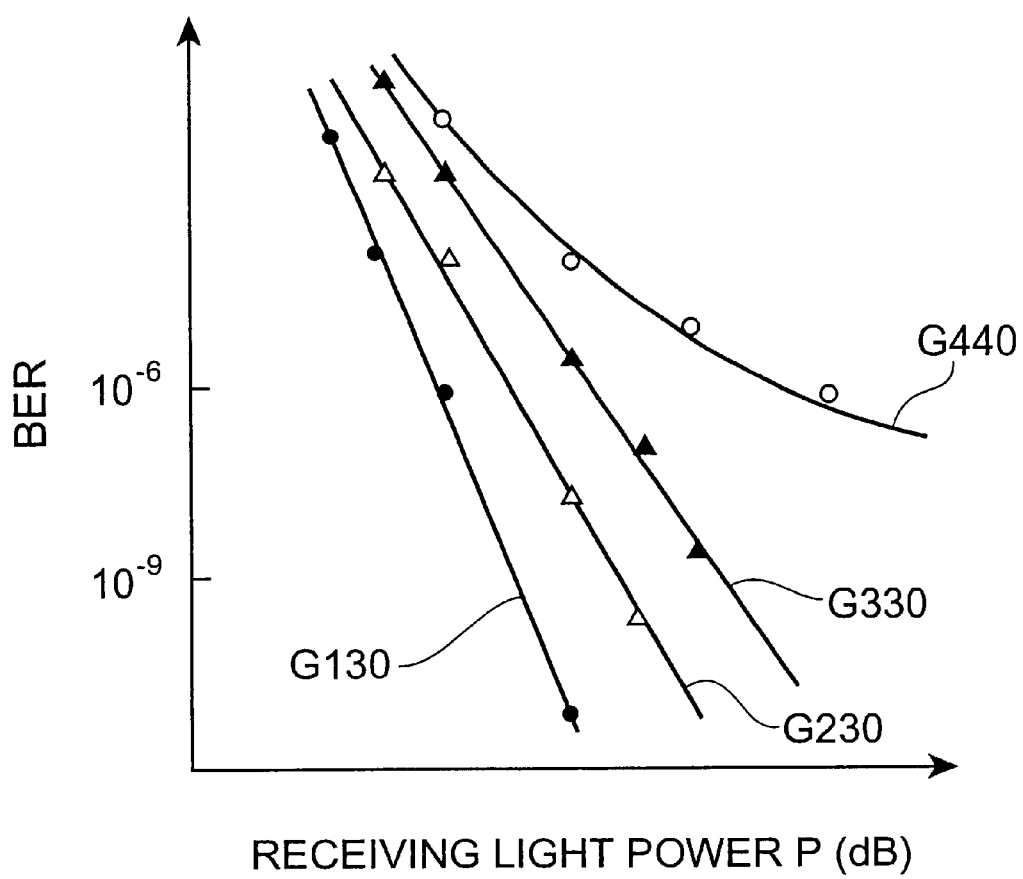
FIG. 16 is a graph showing the relationship between the receiving light power (dB) and BER (Bit Error Rate) concerning various transmission units.

FIG. 16 is a graph showing the relationship between the receiving light power (dB) and BER (Bit Error Rate) concerning various transmission units. In the graph, G130 is a curve concerning a transmission unit having a structure in which a DSF 52 is held between two SMFs 51, 53 as shown in FIG. 15, G230 is a graph concerning a transmission unit constituted by only a DSF having a low dispersion and a high nonlinear characteristic, G330 is a graph concerning a transmission unit constituted by only an SMF having a high dispersion, and G440 is a graph concerning a transmission unit arranged such that signals successively pass through a DSF and an SMF. As can be seen from these curves, though BER decreases as the power of propagating signals increases (receiving light power increases) in general, transmission quality deteriorates under the influence of nonlinear optical phenomena as the signal power increases in the transmission unit in which signals successively propagate from a DSF to an SMF as in curve G440. It can also be seen that a higher transmission quality can be secured at a lower signal power in the transmission unit having a structure in which signals must pass through an SMF before propagating through a DSF (curve G130) as in this embodiment, as compared with transmission units with the other structures (curves G230 and G330).

Figure 17A:
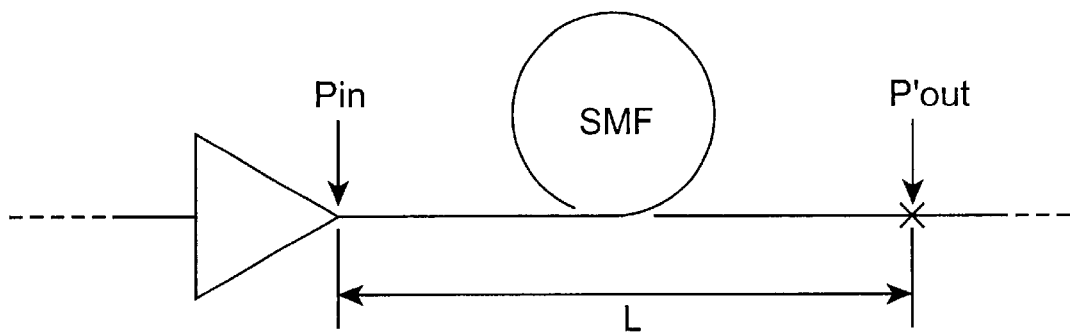

The effective length $L_{eff}$ of SMF substantially susceptible to the influence of nonlinear optical phenomena will now be explained. The actual length L of SMF is the length between the output end of the optical fiber amplifier disposed upstream and the DSF disposed downstream as shown in FIG. 17A. Letting α (dB/km) be the transmission loss of the SMF, the effective length $L_{eff}$ is given as follows:

$$L_{eff} = \frac{1 - \exp(-\alpha_0 L)}{\alpha_0} \text{ (km)}$$

$$\alpha = 4.343\alpha_0$$

Figure 17B:
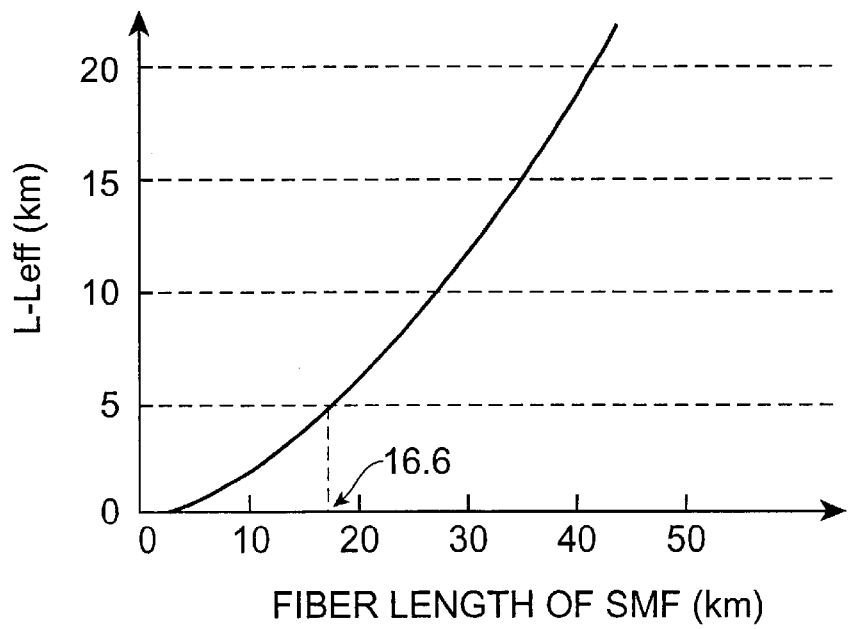
FIG. 17B is a graph showing the relationship between the fiber length (km) of single-mode optical fiber and the difference between the fiber length and the effective length.

FIG. 17B shows the relationship between the effective length $L_{eff}$ and the actual fiber length of SMF. Though the part of effective length $L_{eff}$ is a part substantially susceptible to the influence of nonlinear optical phenomena, the surplus part of (L−$L_{eff}$) can be regarded as a part which is influenced by dispersion alone. Therefore, when the difference between the actual fiber length L of SMF and the effective length $L_{eff}$ in the SMF is 5 km (length of surplus part) as indicated in FIG. 17B, for example, the incident light power to the DSF disposed downstream from the SMF can further be reduced by 1 dB (=0.2(L−L$_{eff}$)=0.2×5) or more as compared with the effective length L$_{eff}$ of SMF if the transmission loss α of the SMF isle 0.2 dB/km.

Figure 18:
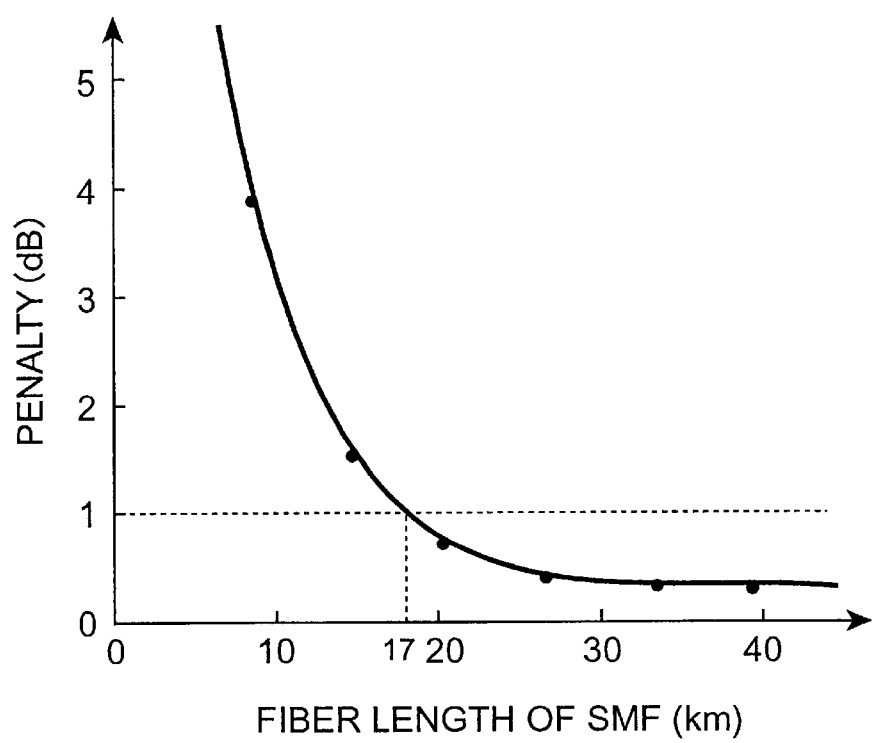
FIG. 18 is a graph showing the relationship between the fiber length (km) of single-mode optical fiber and penalty (dB)

On the other hand, FIG. 18 relates to the result of measurement concerning the hybrid transmission unit 200 shown in FIG. 15 when signals are transmitted from the communicator 58 to the communicator 59, and is a graph showing the relationship between the fiber length of the upstream SMF 51 and penalty when the fiber length of the downstream SMF 53 and the fiber length of the DSF 52 are each set to 20 km. In this measurement, the incident light power P$_{in}$ per channel is 10 dBm. As can be seen from this graph, it is necessary for the fiber length of the upstream SMF 51 to be 17 km or more in order to attain a penalty of 1 dB or less. In view of this measurement result and FIG. 17B, it is preferred that the fiber length of SMF be longer than the effective length L$_{eff}$ (km) by 5 km or more in order to secure a desirable transmission quality.

Figure 19A:
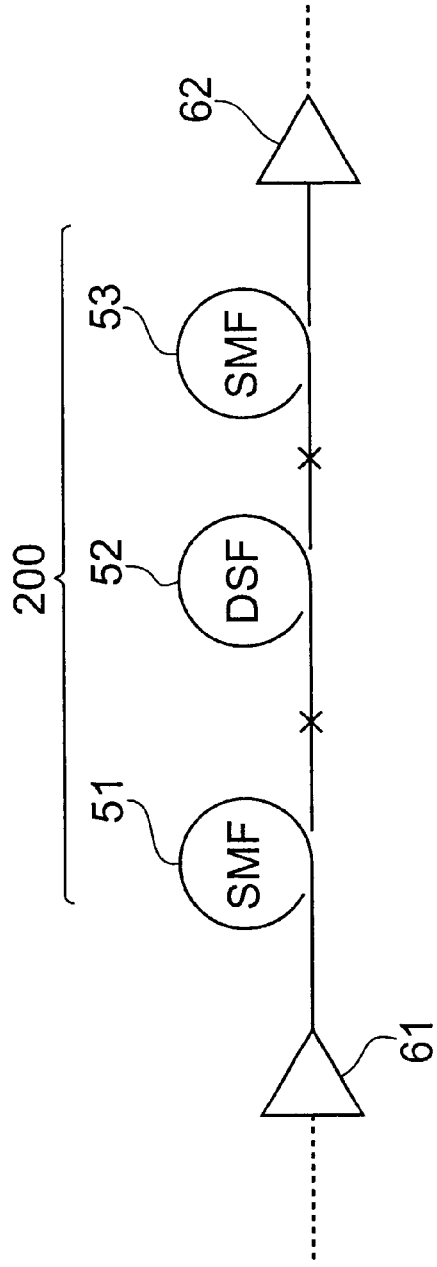
FIGS. 19A and 19B are views showing configurational examples of the WDM optical communication system according to the fifth embodiment employing an optical amplifier, illustrating a configurational example of the system for carrying out unidirectional optical communications and a configurational example of the system for carrying out bidirectional optical communications, respectively.
Figure 19B:
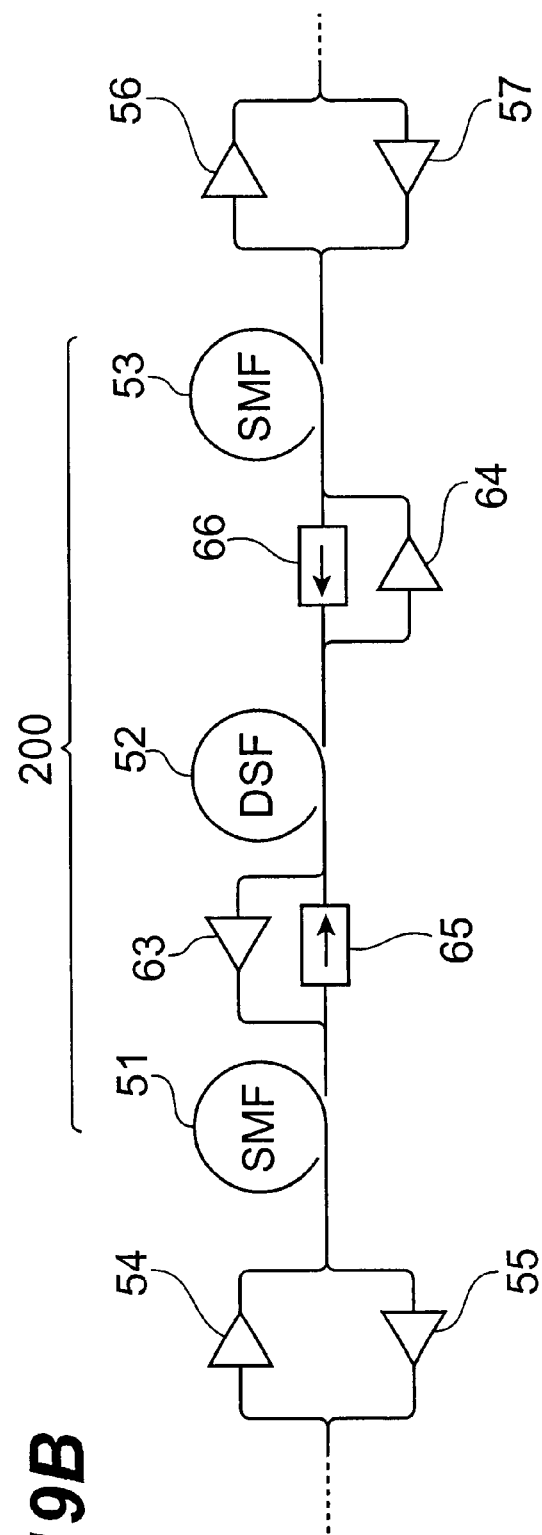

The WDM optical communication system according to the fifth embodiment can be modified in various manners. For example, while the WDM optical communication system shown in FIG. 15 has a configuration enabling bidirectional optical communications between the communicators 58, 59, it may have a configuration in which optical fiber amplifiers 61, 62 are disposed on the entrance and exit end sides of the hybrid transmission unit 200, respectively, as shown in FIG. 19A. Also, as shown in FIG. 19B, it may be configured such that an optical fiber amplifier is disposed within the hybrid transmission unit 200. Since the DSF 52 constituting a part of the hybrid transmission unit 200 has a high nonlinear characteristic, a configuration for amplifying signals entering the DSF 52 is unfavorable. Therefore, in the configuration of FIG. 19B capable of bidirectional optical communications, an optical fiber amplifier 63 for amplifying the signals emitted from the DSF 52 is disposed between the SMF 51 and DSF 52, whereas an optical isolator 65 for transmitting therethrough the signals to enter the DSF 52 is disposed in parallel therewith. Similarly, an optical fiber amplifier 64 for amplifying the signals emitted from the DSF 52 and an optical isolator 66 for transmitting therethrough the signals to enter the DSF 52 are disposed in parallel between the DSF 52 and SMF 53.

Figure 20A:
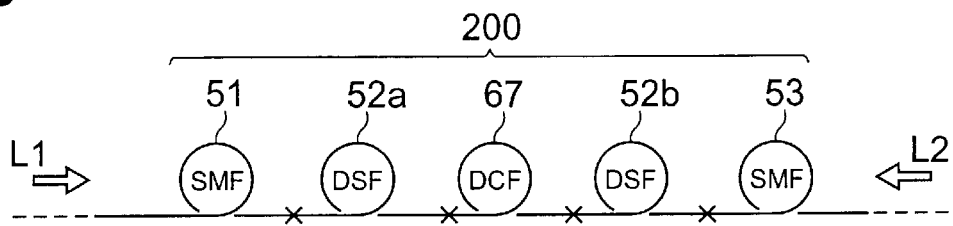
FIGS. 20A to 20C are views showing respective configurational examples of the WDM optical communication system employing a dispersion-compensating optical fiber.
Figure 20B:
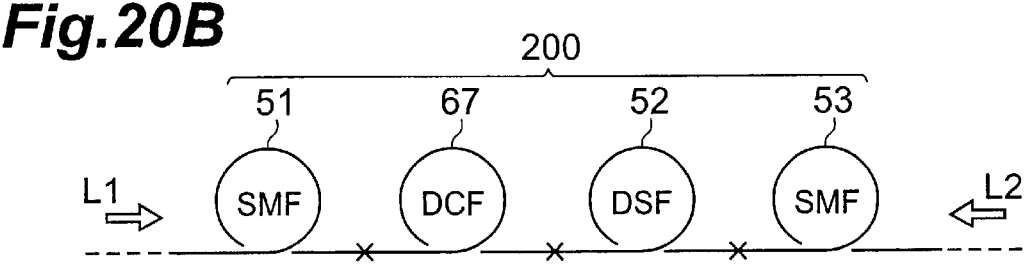
Figure 20C:
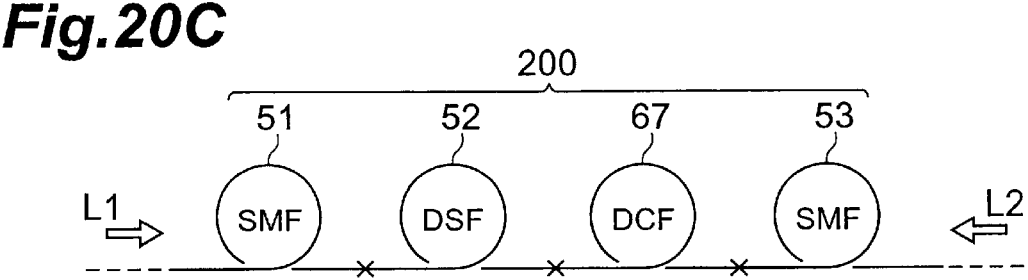

In the WDM optical communication system according to the fifth embodiment, the hybrid transmission unit 200 may further comprise a dispersion-compensating optical fiber 67 (DCF) for compensating for the cumulative dispersion of the hybrid transmission unit 200, and its arrangement can be modified in various manners as shown in FIGS. 20A to 20C.

For example, in the configuration shown in FIG. 20A, the DSF 52 is constituted by a plurality of components 52a, 52b, whereas the DCF 67 is disposed between these components 52a, 52b. In the configuration shown in FIG. 20B, the DCF 67 is disposed between the SMF 51 and DSF 52. In the configuration shown in FIG. 20C, the DCF 67 is disposed between the DSF 52 and SMF 53. In any of these configurations, the cumulative dispersion of the DSF 52 and SMFs 51, 53 can be compensated for. In FIGS. 20A to 20C, arrows L1, L2 show the traveling directions of the signals propagating through the hybrid transmission unit 200.

In accordance with the present invention, as in the foregoing, a single-mode optical fiber and a dispersion-shifted optical fiber which constitute at least a part of a hybrid transmission unit through which signals propagate are arranged such that the signals successively pass through the single-mode optical fiber and dispersion-shifted optical fiber. The single-mode optical fiber has a zero-dispersion wavelength in the 1.3-μm wavelength band and an effective area A$_{SMF}$ at a wavelength of 1.58 μm. The dispersion-shifted optical fiber has a zero-dispersion wavelength in the 1.58-μm wavelength band; and, at a wavelength of 1.58 μm, a dispersion with an absolute value of 0.5 ps/nm/km or more and an effective area A$_{DSF}$ smaller than the effective area A$_{SMF}$ of the single-mode optical fiber. As a consequence of this configuration, the power of each signal entering the dispersion-shifted optical fiber is sufficiently lowered by the single-mode optical fiber disposed upstream, whereas an appropriate dispersion occurs in the dispersion-shifted optical fiber, where by the waveform deterioration of each signal resulting from the interaction between dispersion and nonlinear optical phenomena, such as cross-phase modulation in particular, occurring upon optical communications in the 1.58-μm wavelength band is effectively suppressed.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A WDM optical communication system comprising at least one hybrid transmission unit for transmitting a plurality of signals included in a 1.58-μm wavelength band, said hybrid transmission unit comprising:

a first single-mode optical fiber having a zero-dispersion wavelength in a 1.3-μm wavelength band; and a dispersion-shifted optical fiber provided so as for light emitted from said first single-mode optical fiber to propagate therethrough, said dispersion-shifted optical fiber having a zero-dispersion wavelength residing in a 1.55-μm wavelength band and, at a wavelength of 1.58 μm, a dispersion D with an absolute value of 0.5 ps/nm/km or more, said dispersion-shifted optical fiber satisfying the condition of $$\frac{P}{D \cdot CS} \leq 4.2 \times 10^{13} [(W \cdot m)/s]$$

where P is the optical power per channel in said plurality of signals launched to said dispersion-shifted fiber, and CS is the channel spacing in said plurality of signals.

2. A WDM optical communication system according to claim 1, wherein said dispersion-shifted optical fiber satisfies the condition of $$\frac{P}{D \cdot CS} \leq 2.6 \times 10^{13} [(W \cdot m)/s].$$

3. A WDM optical communication system according to claim 1, further comprising an optical amplifier provided so as to sandwich said first single-mode optical fiber with said dispersion-shifted optical fiber, said optical amplifier amplifying said plurality of signals to be made incident on said first single-mode optical fiber.

4. A WDM optical communication system according to claim 1, wherein said hybrid transmission unit further comprises a dispersion-compensating optical fiber having a dispersion with an opposite sign against the dispersion of said first single-mode optical fiber at a wavelength of 1.58 μm.

5. A WDM optical communication system according to claim 1, wherein said hybrid transmission unit further comprises a second single-mode optical fiber provided so as to sandwich said dispersion-shifted optical fiber with said first single-mode optical fiber, said second single-mode optical fiber having a zero-dispersion wavelength in the 1.3-μm wavelength band.

6. A WDM optical communication system comprising at least one hybrid transmission unit for transmitting a plurality of signals included in a 1.58-μm wavelength band, said hybrid transmission unit comprising:

first and second single-mode optical fibers each having a zero-dispersion wavelength in a 1.3-μm wavelength band, at least one of which has a fiber length longer than an effective length $L_{eff}$ by 5 km or more; and a dispersion-shifted optical fiber disposed between said first and second single-mode optical fibers, said dispersion-shifted optical fiber having a zero-dispersion wavelength in a 1.55-μm wavelength band.

7. A WDM optical communication system according to claim 6, wherein an optical amplifier for amplifying said plurality of signals is disposed in at least one of areas between said first single-mode optical fiber and said dispersion-shifted optical fiber and between said second single-mode optical fiber and said dispersion-shifted optical fiber.

8. A WDM optical communication system according to claim 6, wherein said hybrid transmission unit further comprises a dispersion-compensating optical fiber having a dispersion with an opposite sign against dispersions of said first and second single-mode optical fibers.

9. A WDM optical communication system according to claim 8, wherein said dispersion-shifted optical fiber is constituted by a plurality of components, and wherein said dispersion-compensating optical fiber is provided so as to be sandwiched between a set of components selected from said plurality of components.

10. A WDM optical communication system comprising at least one hybrid transmission unit for transmitting a plurality of signals included in a 1.58-μm wavelength band, said hybrid transmission unit comprising:

first and second single-mode optical fibers each having a zero-dispersion wavelength in a 1.3-μm wavelength band; and a dispersion-shifted optical fiber provided between said first and second single-mode optical fibers, said dispersion-shifted optical fiber having a dispersion with an absolute value of 0.5 ps/nm/km or more but 5 ps/nm/km or less at a wavelength of 1.58 μm.

11. A WDM optical communication system according to claim 10, wherein an optical amplifier for amplifying said plurality of signals is provided in at least one of areas between said first single-mode optical fiber and said dispersion-shifted optical fiber and between said second single-mode optical fiber and said dispersion-shifted optical fiber.

12. A WDM optical communication system according to claim 10, wherein said hybrid transmission unit further comprises a dispersion-compensating optical fiber having a dispersion with an opposite sign against dispersions of said first and second single-mode optical fibers.

13. A WDM optical communication system according to claim 12, wherein said dispersion-shifted optical fiber is constituted by a plurality of components, and wherein said dispersion-compensating optical fiber is provided so as to be sandwiched between a set of components selected from said plurality of components.

14. A WDM optical communication system comprising at least one hybrid transmission unit for transmitting a plurality of signals included in a 1.58-μm wavelength band, said hybrid transmission unit comprising:

a first single-mode optical fiber having a zero-dispersion wavelength in a 1.3-μm wavelength band and, at a wavelength of 1.58 μm, an effective area $A_{SMF}$; and a dispersion-shifted optical fiber provided so as for light emitted from said first single-mode optical fiber to propagate therethrough, said dispersion-shifted optical fiber having a zero-dispersion wavelength residing in a 1.55-μm wavelength band, a dispersion with an absolute value of 0.5 ps/nm/km or more at a wavelength of 1.58 μm, and an effective area $A_{DSF}$ smaller than the effective area $A_{SMF}$ of said first single-mode optical fiber.

15. A WDM optical communication system according to claim 14, wherein said first single-mode optical fiber has a length of 10 km or more; and wherein said WDM optical communication system further comprises an optical amplifier provided so as to sandwich said first single-mode optical fiber with said dispersion-shifted optical fiber, said optical amplifier amplifying said plurality of signals to be made incident on said first single-mode optical fiber.

16. A WDM optical communication system according to claim 14, wherein said hybrid transmission unit further comprises a dispersion-compensating optical fiber having a dispersion with an opposite sign against the dispersion of said first single-mode optical fiber at a wavelength of 1.58 μm.

17. A WDM optical communication system according to claim 16, further comprising an optical amplifier provided so as to sandwich said first single-mode optical fiber with said dispersion-shifted optical fiber, said optical amplifier amplifying said plurality of signals;

wherein said dispersion-compensating optical fiber is provided so as to sandwich said optical amplifier with said first single-mode optical fiber.

18. A WDM optical communication system according to claim 14, wherein said first single-mode optical fiber has a polarization mode dispersion of 2 ps·km$^{-\frac{1}{2}}$ or less at a wavelength of 1.58 μm, and said dispersion-shifted optical fiber has a polarization mode dispersion of 2 ps·km$^{-\frac{1}{2}}$ or less at a wavelength of 1.58 μm.

19. A WDM optical communication system according to claim 16, wherein said first single-mode optical fiber has a polarization mode dispersion of 2 ps·km$^{-\frac{1}{2}}$ or less at a wavelength of 1.58 μm, said dispersion-shifted optical fiber has a polarization mode dispersion of 2 ps·km$^{-\frac{1}{2}}$ or less at a wavelength of 1.58 μm, and said dispersion-compensating optical fiber has a polarization mode dispersion of 2 ps·km$^{-\frac{1}{2}}$ or less at a wavelength of 1.58 μm.

20. A WDM optical communication system according to claim 14, wherein, letting B be the bit rate of signals, said hybrid transmission unit as a whole has a cumulative polarization dispersion of 1/(4B) or less at a wavelength of 1.58 μm.

21. A WDM optical communication system according to claim 14, wherein said hybrid transmission unit further comprises a second single-mode optical fiber provided so as to sandwich said dispersion-shifted optical fiber with said first single-mode optical fiber, said second single-mode optical fiber having a zero-dispersion wavelength in the 1.3-μm wavelength band.

* * * * *